US010054939B1

(12) United States Patent
Applewhite

(10) Patent No.: US 10,054,939 B1
(45) Date of Patent: Aug. 21, 2018

(54) UNMANNED AERIAL VEHICLE SYSTEMS AND METHODS OF USE

(71) Applicant: Paul G. Applewhite, Seattle, WA (US)

(72) Inventor: Paul G. Applewhite, Seattle, WA (US)

(*) Notice: Subject to any disclaimer, the term of this patent is extended or adjusted under 35 U.S.C. 154(b) by 665 days.

(21) Appl. No.: 14/033,511

(22) Filed: Sep. 22, 2013

Related U.S. Application Data

(60) Provisional application No. 61/711,883, filed on Oct. 10, 2012, provisional application No. 61/704,477, filed on Sep. 22, 2012.

(51) Int. Cl.
B64C 27/82 (2006.01)
G05D 1/00 (2006.01)
(Continued)

(52) U.S. Cl.
CPC ......... G05D 1/0027 (2013.01); B64C 39/024 (2013.01); B64F 1/04 (2013.01); B64F 1/06 (2013.01); B64C 27/82 (2013.01); B64C 29/0083 (2013.01); B64C 29/02 (2013.01); B64C 2201/024 (2013.01); B64C 2201/08 (2013.01); B64C 2201/084 (2013.01); B64C 2201/088 (2013.01); B64C 2201/126 (2013.01); B64C 2201/146 (2013.01)

(58) Field of Classification Search
None
See application file for complete search history.

(56) References Cited

U.S. PATENT DOCUMENTS 2,422,337 A 6/1947 Chilowsky
2,422,441 A 6/1947 Sights
(Continued)

FOREIGN PATENT DOCUMENTS

WO 03059735 A3 7/2003
WO 2005099415 A3 10/2005
(Continued)

OTHER PUBLICATIONS

Fujizawa. 2012. Control System Development and Flight Testing of the Tiger Moth UAV. Presentation to American Helicopter Society 68th Annual Forum, Fort Worth, TX, May 1-3, 2012.
(Continued)

Primary Examiner — Shelley Chen
(74) Attorney, Agent, or Firm — K Karel Lambert; Lambert Patent Services, LLC

(57) ABSTRACT

An improved unmanned aerial vehicular system having a rotor head assembly with any balanced number of rotary wings or blades, a generally tubular body assembly, a gimballed neck connecting the head to the body, and a navigation, communications and control unit such as for military and humanitarian operations, including payload delivery and pickup. The vehicle is generally guided using a global positioning satellite signal, and by pre-programmed or real time targeting. The vehicle is generally electrically powered and may be launched by one of (a) hand-launch, (b) air-drop, (c) catapult, (d) tube-launch, or (e) sea launch, and is capable of landing on both static and dynamic targets. Once launched, unmanned aerial vehicles may be formed into arrays on a target area and find use in surveillance, warfare, and in search-and-rescue operations.

34 Claims, 36 Drawing Sheets

(51) Int. Cl.
*B64C 39/02* (2006.01)
*B64F 1/04* (2006.01)
*B64F 1/06* (2006.01)
*B64C 29/00* (2006.01)
*B64C 29/02* (2006.01)

(56) References Cited

U.S. PATENT DOCUMENTS

| | | | |
|---|---|---|---|
| 3,460,058 A | 8/1969 | Taplin | |
| 3,558,081 A | 1/1971 | Williams | |
| 3,612,444 A | 10/1971 | Girard | |
| 3,721,405 A * | 3/1973 | Jackson | B64C 27/14 244/17.21 |
| 3,825,213 A | 7/1974 | Saunders | |
| 3,978,790 A | 9/1976 | Sandelius | |
| 4,396,878 A | 8/1983 | Cole | |
| 4,912,999 A | 4/1990 | Franks | |
| 5,058,824 A | 10/1991 | Cycon | |
| 5,749,540 A | 5/1998 | Arlton | |
| 6,164,179 A * | 12/2000 | Buffman | F41F 3/07 114/316 |
| 6,347,764 B1 * | 2/2002 | Brandon | F42B 10/58 102/388 |
| 6,450,446 B1 | 9/2002 | Holben | |
| 6,687,186 B1 | 2/2004 | Fields | |
| 6,863,241 B2 | 3/2005 | Sash | |
| 7,262,395 B2 | 8/2007 | Bilyk | |
| 7,789,341 B2 * | 9/2010 | Arlton | B64C 27/10 244/17.23 |
| 7,946,241 B2 * | 5/2011 | Sampson | B63B 22/003 114/261 |
| 8,042,763 B2 | 10/2011 | Arlton | |
| 8,056,461 B2 * | 11/2011 | Bossert | F41F 3/07 114/316 |
| 8,083,173 B2 * | 12/2011 | Arlton | B64C 39/024 244/17.23 |
| 8,091,461 B1 * | 1/2012 | Buescher | F41F 7/00 114/318 |
| 8,439,301 B1 | 5/2013 | Lussier | |
| 8,469,307 B2 | 6/2013 | Arlton | |
| 8,720,816 B2 * | 5/2014 | Salkeld | B64C 17/04 244/17.19 |
| 9,434,471 B2 * | 9/2016 | Arlton | B64C 27/14 |
| 9,453,705 B2 * | 9/2016 | Sylvia | B63G 8/001 |
| 2002/0154996 A1 * | 10/2002 | Karem | B64C 27/33 416/1 |
| 2004/0245376 A1 * | 12/2004 | Muren | A63H 27/12 244/17.11 |
| 2005/0051667 A1 * | 3/2005 | Arlton | B64C 27/10 244/17.11 |
| 2006/0011777 A1 * | 1/2006 | Arlton | B64C 27/10 244/7 B |
| 2007/0129853 A1 * | 6/2007 | Greenfeld | G01C 11/02 701/3 |
| 2008/0211912 A1 * | 9/2008 | Greenfeld | G01C 11/02 348/144 |
| 2008/0245924 A1 * | 10/2008 | Arlton | B64C 39/024 244/17.13 |
| 2009/0107386 A1 * | 4/2009 | Sampson | B63B 22/003 114/261 |
| 2009/0212157 A1 * | 8/2009 | Arlton | B64C 27/10 244/63 |
| 2010/0012774 A1 | 12/2010 | Fanucci | |
| 2011/0006166 A1 * | 1/2011 | Arlton | B64C 27/10 244/7 A |
| 2011/0073707 A1 * | 3/2011 | Bossert | F41F 3/07 244/63 |
| 2012/0025012 A1 * | 2/2012 | Arlton | B64C 27/10 244/17.13 |
| 2012/0091259 A1 | 4/2012 | Barrett | |
| 2012/0205488 A1 * | 8/2012 | Powell | B64C 39/024 244/63 |
| 2012/0303179 A1 * | 11/2012 | Schempf | B25J 11/002 701/2 |
| 2012/0321481 A1 * | 12/2012 | DeJesus | F03B 3/126 416/241 R |
| 2013/0105628 A1 | 5/2013 | Buscher | |
| 2013/0168489 A1 * | 7/2013 | McIntee | B64C 3/38 244/13 |
| 2013/0306791 A1 | 11/2013 | McGeer | |
| 2014/0008496 A1 | 1/2014 | Ye | |
| 2014/0091172 A1 * | 4/2014 | Arlton | B64C 27/14 244/17.23 |
| 2014/0299708 A1 * | 10/2014 | Green | B64C 27/32 244/17.23 |
| 2017/0166305 A1 | 6/2017 | Arlton | |
| 2017/0320565 A1 * | 11/2017 | Gamble | B64C 27/39 |

FOREIGN PATENT DOCUMENTS

| | | |
|---|---|---|
| WO | 2008089432 A3 | 7/2008 |
| WO | 2014025444 A3 | 2/2014 |

OTHER PUBLICATIONS

Patriots Point. First Practical Sonobuoy 1942, https://www.patriotspoint.org/news-and-events/first-practical-sonobuoy-1942/ (first accessed Sep. 29, 2017).
Listening Sticks: US Navy Sonobuoy Contracts. 2015. www.defenseindustrydaily.com/listening-sticks-us-navy-sonobuoy-contracts-02982/ (first accessed Sep. 29, 2017).
Sonobuoy. Wikipedia. https://en.wikipedia.org/wiki/Sonobuoy (first accessed Aug. 12, 2017).
Anderson, Chris. How I accidentally kickstarted the domestic drone boom. In, Wired. Dated Jun. 22, 2012. Accessed Jun. 5, 2014 at http://www.wired.com/2012/06/ff_drones/all/.

* cited by examiner

400

400

450

450

1110 ● QUEEN VEHICLE

1120 ◎ SWARM VEHICLE

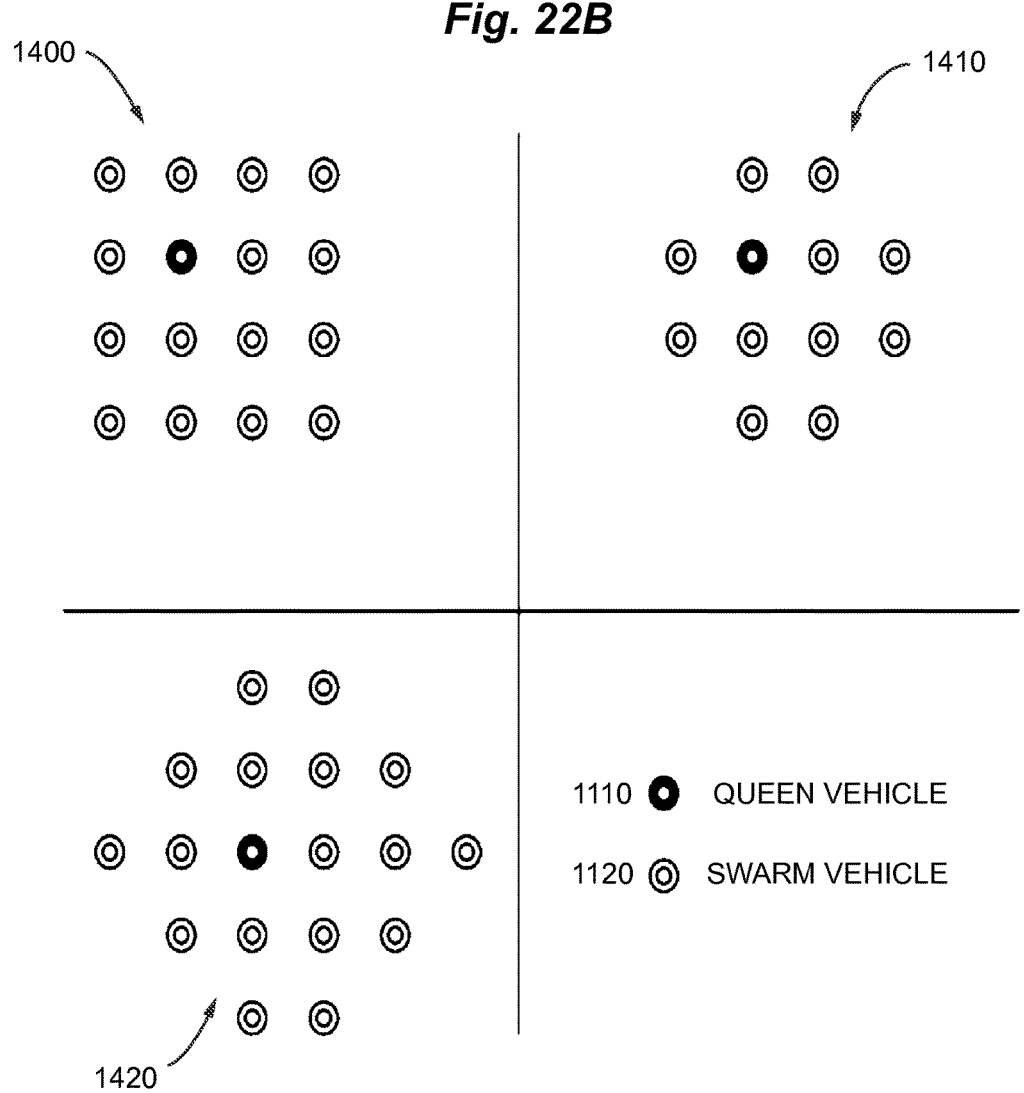

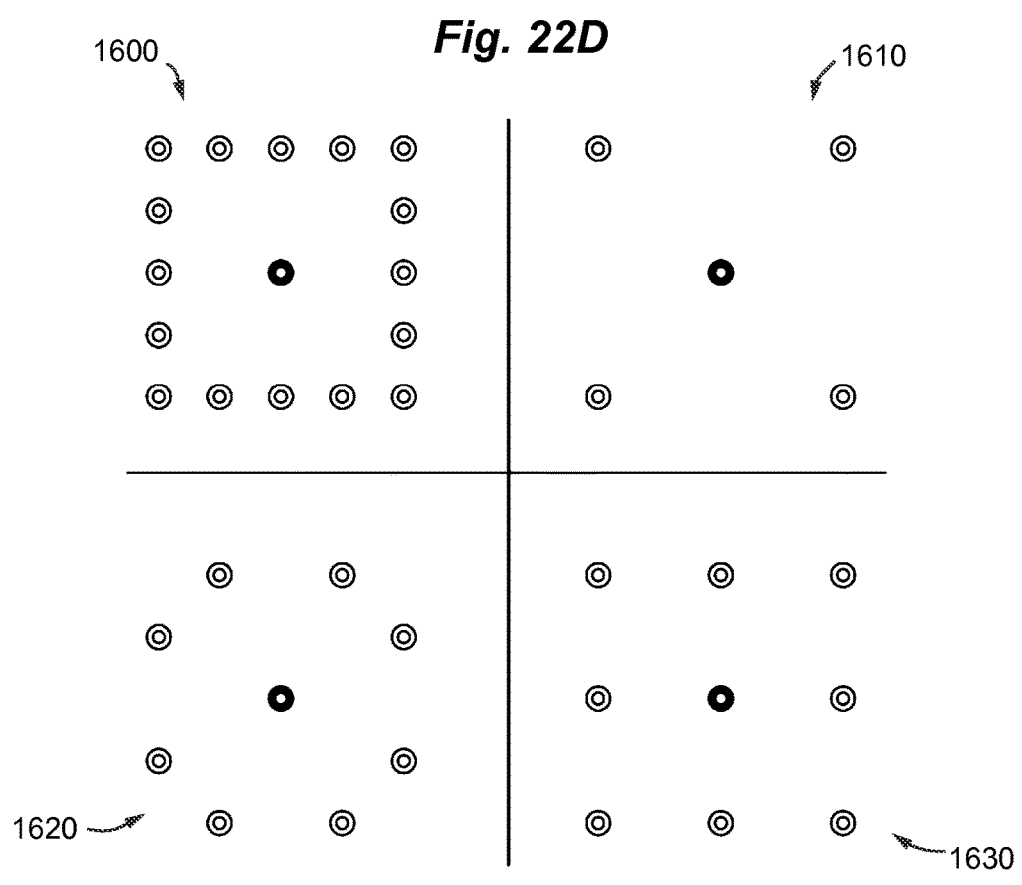

1110 ● QUEEN VEHICLE
1120 ◎ SWARM VEHICLE

1110 ● QUEEN VEHICLE
1120 ◎ SWARM VEHICLE

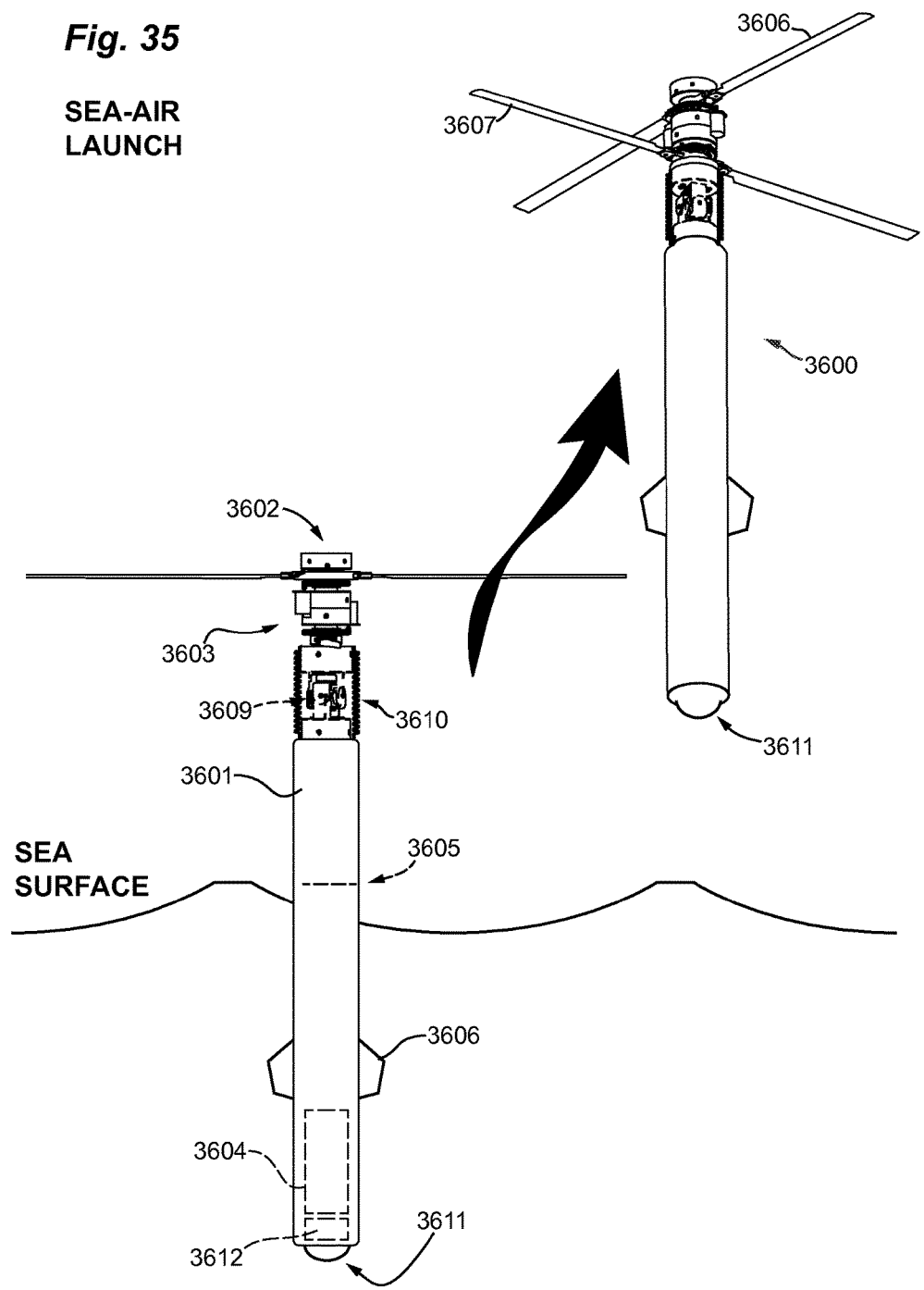

UNMANNED AERIAL VEHICLE SYSTEMS AND METHODS OF USE

CROSS REFERENCE TO RELATED APPLICATIONS

This application is related to and claims the benefit of US Provisional Application Ser. No. 61/711,883 filed on 10 Oct. 2012, and entitled "System and Methods for Deploying Unmanned Vehicles in Formation," and US Provisional Application Ser. No. 61/704,477 filed on 22 Sep. 2012, and entitled "Unmanned Rotary-wing System," the contents of said provisional applications are hereby incorporated by reference in full for all purposes.

GOVERNMENT SUPPORT

Not Applicable.

FIELD OF THE INVENTION

This invention is related to unmanned aerial vehicular systems for non-ballistic flight and more particularly to methods of deploying arrays of vehicles in communication with a remote workstation.

BACKGROUND

Unmanned rotary-wing vehicular systems have found increasing use in carrying payloads and serving as the eyes and ears of human operators, having great advantage in not requiring runways for takeoff and landing. Further improvements are needed in unmanned systems for tasks such as precision delivery of sensors, payloads such as ammunition and medical supplies, humanitarian supplies for rescue missions, and critical replacement parts to remote or difficult to reach locations. Ideally the systems also may be used to deploy or deliver sensors for military and industrial surveillance applications and to land on fixed or moving targets without the need for a runway or extensive operator training. Preferably the systems are scalable, so that a compact and portable version for hand operation or cluster deployment and a larger vehicle for resupply may be developed on a common platform.

Related art includes U.S. Pat. No. 7,789,341 (the '341 disclosure) and U.S. Pat. No. 8,469,307 (the '307 disclosure) to Arlton, which describes a rotor means mounted on an elongate body in which the rotor system blades are collectively and cyclically pitchable with planetary gears, i.e., having a complex hub constructed in the manner of a miniature helicopter. Also relevant are US Pat. Publ. Nos. 2005/0051677 (the '677 disclosure) and 2008/0245924 (the '924 disclosure) to Arlton. FIG. 22 of the '677 disclosure shows an optional tail rotor model having an obvious resemblance to a helicopter.

Commercially, Kamov KA helicopters illustrate twin coaxial counter-rotating rotor flight. The rotor pitch is controlled by a collective and cyclical pitch mechanism actuated by a swash plate. Miniature helicopters are also known, as depicted in U.S. Pat. No. 7,662,013 (the '013 disclosure) to Van de Rostyne. Pitch is controlled cyclically using a control ring associated with the main rotor and an actuator. Also shown is a tail rotor for stabilizing flight. However, the miniature vehicles have essentially no payload delivery capability.

U.S. Pat. No. 6,347,764 (the '764 disclosure) to Brandon teaches a cylindrical hand-held miniature helicraft having two motor-driven, counter-rotating rotors with collective and cyclic pitch to steer in combination with a deployable tail rotor. The rotors are foldable via hinges into the body for artillery launch. Cyclic pitch control adds substantial complexity and is expensive to produce.

U.S. Pat. No. 8,146,854 (the '854 disclosure) describes counter-rotating rotors and a fuselage that maneuvers by adjusting the pitch of the rotor blades through at least 120 degrees, eliminating the need for a tail rotor. However, the device requires at least one on-board gyroscope and extensive programming to operate and has essentially no payload capacity.

Petrides in U.S. Pat. No. 3,149,803 (the '803 disclosure) describes a tethered hovering platform with counter-rotating rotary wings having a tilt blade mechanism on a fixed shaft. This is associated with significant loads on delicate pins, limiting its reliability. Directional flight is lacking, requiring a tether system to reposition the platform.

Thus these devices have limitations in capabilities and remain expensive and complex to operate and maintain. There has been a long-standing need for improvements in an unmanned aerial vehicular system that overcome the known difficulties in the art and offers advantages in reliability, portability, and simplicity in use.

SUMMARY

Disclosed is a configurable unmanned rotary-wing system comprising (1) a head assembly having at least one lift-generating mechanism, the lift generating mechanism comprising fixed-pitch rotary wings or blades rotatingly mounted on the head and a gear linkage to a power source for rotational lift, and (2) a vehicle body assembly or fuselage pendantly connected to the inferior aspect of the head by a gimballed coupling. The vehicle body is generally aerodynamic in shape and the center Z-axis of the body is generally normal to the horizon in flight. The system includes gimbal control elements enabled to articulate the pitch attitude of the head so as to effect directional flight; and (3) a navigation, communication and control system for directing flight and receiving commands from remote operators. In a preferred embodiment, the unmanned rotary-wing system is electrically powered and is guided by a GPS-based navigation system.

The lift generating structure may be provided as a rotor blade or blades, by a rotary-wing assembly, or by pairs of counter-rotating blades or wings on a common axis. Multiple lift generating assemblies may be provided as part of the head. In a preferred embodiment, the rotor blades are quickly replaceable and fold against the vehicle body when not in use. However, unexpectedly and contrary to conventional wisdom, pitch control of the blades such as seen in helicopters is not needed. The vehicle may be turned from one vector to another by altering the articulation of the head and the body. The knuckle joining the head and body is actively controlled so that changes in rotor pitch attitude result in corresponding directional vector changes. By angling the head relative to the body, part of the lift vector generated by the rotating wing assemblies becomes useable in effecting horizontal motion of the vehicle. This is an advance in the art leading to a new generation of light weight, inexpensive and rapidly deployable aerial vehicles capable of both directional flight and hover.

The unmanned aerial system of the invention is capable of being launched by one of a) hand-launch, b) air-drop, c) catapult, d) tube-launch, wherein tube-launch may include mortar, air-gun, cannon, and grenade launcher, or (e) sea launch. The unmanned rotary-wing system is capable of landing on one of static or dynamic targets, where dynamic targets include for example ground vehicles and marine vessels. The unmanned rotary-wing system is retrievable, re-deployable, and field programmable. Navigation can be controlled using pre-programmed waypoints, or may be interactive, as by a visual loop from the vehicle to a remote operator.

In another aspect, the invention includes a method for deploying a swarm of unmanned aerial vehicles for use in surveillance, search-and-rescue, munitions deployment, and related applications. A preferred embodiment of the method uses aerial vehicles for forming a precision array over a target area. Steps of a method for deploying a swarm of unmanned aerial vehicles onto a target area include (a) providing a plurality of unmanned aerial vehicles; (b) mapping an array onto a target area, the array comprising a plurality of nodes, and programming each of the plurality of vehicles to navigate under GPS control to a designated node; (c) launching the plurality of vehicles into the air and dispersing them as a swarm at an altitude effective for achieving a controlled ascent and hover flight mode; (d) flying the vehicles to the designated nodes of the array and hovering thereover or landing thereon; and (e) effecting array operations, which may include surveillance, search-and-rescue, targeting and range-finding, and demolition, for example. The method also may include (e) landing the swarm vehicles such that the vehicles are spatially disposed essentially at the "n" nodes of the ordered array over the target area. Generally the swarm vehicles are rotary-wing vehicles; and may include fixed-pitch or variable-pitch rotor assemblies for steering. Where fixed-pitch rotor vehicles are used, a gimballed neck connecting the rotor head to the lower body may be used to effect directional control. Preferably a queen vehicle functions to coordinate communications between the swarm and a remote workstation. Positional data from each swarm vehicle is also transmitted to a remote workstation so as to "place-stamp" sensor data collected by the swarm vehicles.

Also disclosed are vehicles for controlled descent. A preferred method of using these vehicles involves pre-programming target coordinates for each of "n" vehicles, where the coordinates conform to "n" nodes of an array mapped onto the target site. A queen vehicle also may be designated to handle communications between the swarm and a RCW. Each vehicle executes flight commands to arrive at the programmed coordinates and land so as to establish a stationary array. Array operations are then initiated. The vehicles may used to conduct ground-based operations or may be landed on water for Naval operations as needed. Rotary-wing confirmations and greater wing area may be combined with a gimballed neck steering feature for quiet operations as required to support Special Forces stealth operations.

The foregoing and other elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings in light of the detailed description, in which:

FIGS. 22A and 22B are schematic representations of alternate array configurations of swarm and queen vehicles. Also shown is a legend.

FIGS. 22D, 22E, 22F and 22G depict alternate planar array formations for deploying swarm vehicles.

FIGS. 32B and 33B are sectional views.

FIG. 35 shows a method for effecting a sea-air launch of an unmanned aerial rotary-wing vehicle with sonar capability.

Figure 1:
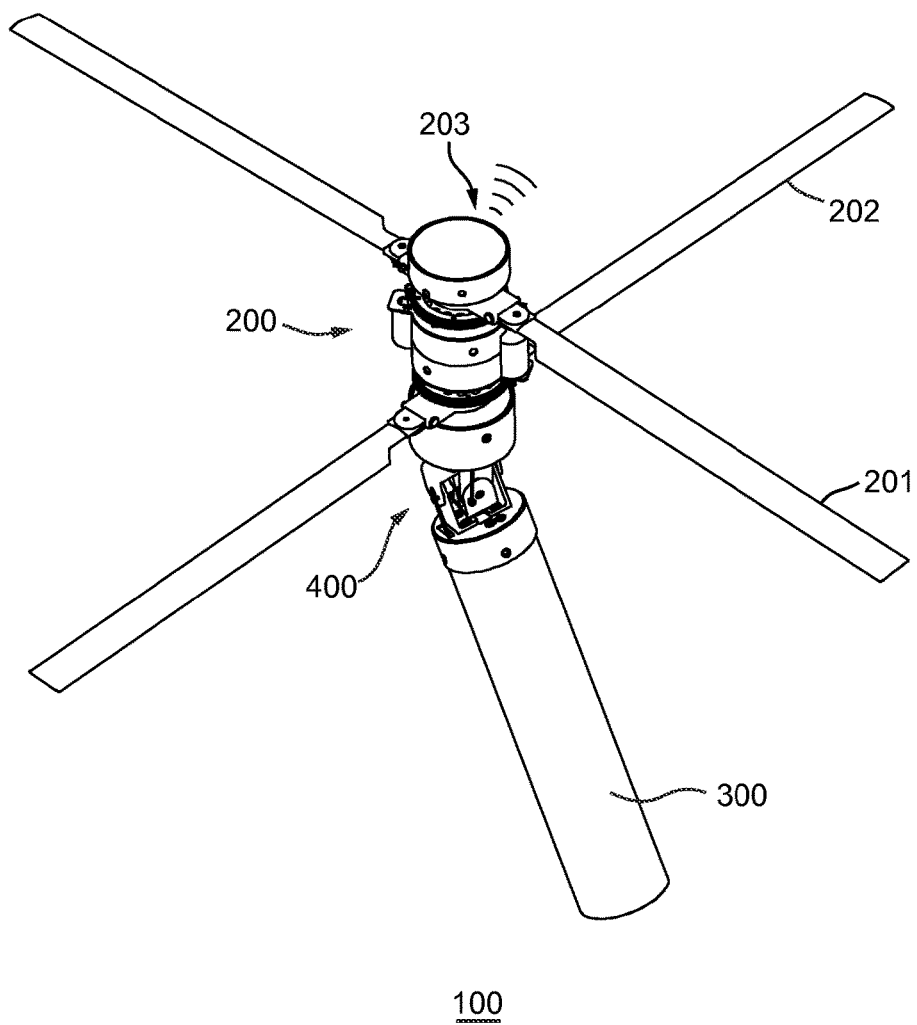
FIG. 1 is a perspective view of a first unmanned vehicle of the invention in directional flight.

The drawing figures are not necessarily to scale. Certain features or components herein may be shown in somewhat schematic form and some details of conventional elements may not be shown in the interest of clarity, explanation, and conciseness. Elements and acts depicted are not necessarily rendered according to any particular sequence or embodiment. The drawing figures are hereby made part of the specification, written description and teachings disclosed herein.

NOTATION AND NOMENCLATURE

Certain terms throughout the following description are used to refer to particular features, steps or components, and are used as terms of description and not of limitation. As one skilled in the art will appreciate, different persons may refer to the same feature, step or component by different names. Components, steps or features that differ in name but not in function or action are considered equivalent and not distinguishable, and may be substituted herein without departure from the invention. Certain meanings are defined here as intended by the inventors, i,e., they are intrinsic meanings. Other words and phrases used herein take their meaning as consistent with usage as would be apparent to one skilled in the relevant arts. The following definitions supplement those set forth elsewhere in this specification.

"Pitch attitude" flying is used in both airplane and helicopter flying. The pitch attitude of the aircraft determines the forward speed, and the power determines the altitude. Pitch attitude of a helicopter refers to the plane of rotation of the blades. Pitch attitude flying is facilitated by use of counter-rotating rotary wings or blades, which provide for control of roll torque that must otherwise be provided by tail rotors. The roll torque from each set of blades is cancelled out by the opposite torque vector generated by the counter rotating blade system.

"Gimballed neck" refers to a specialized gimbal coupling between a rotor head and a fuselage where hinged brackets capable of angulated translocation or precession around a Z-axis are supplied with a means for controlledly fixing the positional angle so as to couple torque from the fuselage to the rotor mechanism(s). Gimbal biasing means include actuator rods operated by servo motors, stepper motors disposed for axial rotational control of the hinges relative to each other in at least the X-Y dimensions (where the Z-axis is the long axis through the fuselage and is generally perpendicular to the horizon), and stepper motors with worm gear actuators for "bending" the hinged members so as to "kink" or "angulate" the gimballed knuckle.

A set of "rotors" is defined as one or more rotor blades attached to a common rotor mechanism assembly and balanced to prevent uneven rotation. Rotors are also sometimes termed "rotary wings". When multiple sets of rotors are used in a single configuration, they will rotate about a common axis and are typically counter-rotated to neutralize torque, as is well known in the art. The common axis will be the central vertical axis of the structure (i.e., a Z-axis). The rotor blades typically are locked during operation in an essentially horizontal position relative to the central vertical axis of the structure. In a preferred embodiment, the rotor blades are interchangeable. They may be flexible to resist breakage or rigid to optimize lift performance.

"Unmanned aerial vehicle" includes both fixed wing and rotary-wing vehicles. For clarity, unless the term is used in comparison of fixed and rotary-wing vehicles, as used here the term is generally limited to the properties and structure of rotary-wing vehicles. Unlike model helicopters and the like, unmanned vehicles of the invention are capable of operation beyond visual line of sight, and optionally may include a range of sensors to assist in piloting the vehicles from a remote command and control center. Unlike fixed wing vehicles, rotary-wing aerial vehicles are capable of "hover" mode and vertical takeoff and landing (VTOL), or may be designed for "controlled descent" as described below.

"Ballistic": of or relating to ballistics or to a body in motion according to the laws of projectiles governed by gravity. "Non-ballistic" relates to motion that breaks the laws of gravity either by use of a steering mechanism on a projectile or by use of a levitating mechanism on a vehicle. Steering mechanisms may include pitch attitude control, variable pitch rotors, tail rotors, vanes, ailerons, winglets, and related means known in the art of unmanned aerial vehicles. Levitating means may include rotary-wing assemblies, rotary blades, aerofoils, and related means known in the art of unmanned vehicles.

"Controlled descent flying" or "controlled descent aerial vehicle" refers to a method of flying or an apparatus for flying in which an unmanned vehicle's motion is modified from a ballistic trajectory and may include motions in an X-Y plane normal to gravity but includes essentially no active ascent and limited capacity to hover. Controlled descent may be a function of the "lift-to-load ratio", i.e., in some instances a payload may prevent controlled or active ascent but upon discharge of the payload the vehicle is able to take off and ascend. Thus controlled descent flying is not synonymous with passive descent, and includes flight with active powered maneuvering on the way down to land on a terrain or a body of water. Motorized vehicles of this class may have a "lift-to-load ratio" that is less than one and is insufficient for active ascent because of the vehicle's payload weight. In a preferred embodiment, controlled precision descent is used to position a swarm of "n" aerial rotary-wing vehicles over "n" nodes of an ordered array covering a target. In some embodiments, the vehicles are capable of landing in a cross-wind and landing on or around stationary and moving targets.

"Controlled ascent flying" or "controlled ascent aerial vehicle" refers to a method of flying or an apparatus for flying an unmanned vehicle in which the vehicle's motion is modified from a ballistic trajectory and may include motions in an horizontal plane, ascent in the Z-plane (against gravity), and capacity to hover under power. Motorized vehicles of this class may have a "lift-to-load ratio" that is greater or equal to one, and is sufficient for active ascent within a designated payload weight range. This kind of flying and class of vehicles may enable return to the air from an intermediate landing site, as in a return to base, and may include capability to deliver and pick up a payload or cargo. A preferred controlled ascent vehicle has counter-rotating coaxial rotary-wing configuration. The rotary-wing assembly may have variable collective pitch control if desired. A yet more preferred combination includes a gimballed neck. Controlled ascent and hovering is achieved with rotors, vanes, and aerofoils such as ailerons having motorized control surfaces and also gimballed necks for controlling rotor pitch attitude or for controlling aerofoil attitude. In a preferred embodiment, controlled precision ascent flying is used to position a swarm of "n" aerial vehicles over "n" nodes of an ordered array covering a target and to hover in position or to move en masse across a terrain or a body of water, optionally then landing to remain stationary while collecting sensor data. In other embodiments, the vehicles are capable of landing in a cross-wind and landing ahead of, on or around moving or stationary targets such as vehicles, troops, camps, trails, roads, rails, airports and significant sites or areas more generally, both on land and on sea.

"Sensors" refer to data acquisition instrumentation, including sensors for detecting and interpreting positional clock data from global positioning satellites (GPS), altitude data from altimeters, range-finding data for targeting and wayfinding, an on-board compass, and also data from specialized sensors enabled for collecting images, sounds and sound patterns, wind speed and direction, humidity and precipitation, temperature, smoke detectors, weather-related data generally, motion sensors for detecting movement of troops, refugees, vehicles, vessels and so forth, infrared sensors, radiation sensors, radar signal detectors, sensors for detecting and triangulating signal transmissions, chemical sensors such as for urea and uric acid, or Sarin and VX nerve gas, or biological agents, and sonographic sensors that include acoustic pulse generation and pulse echo detection instrumentation and passive listening for operation when immersed in a body of water, while not limited thereto.

"Payload" refers to weight of an unmanned aerial vehicle in excess of the device itself. This can be supplies, munitions, and "cargo" generally for delivery to a target area, more particularly medical supplies, humanitarian supplies, ammunition, spare parts, and a variety of sensors, and also can include materials collected for a return trip.

"Wireless networks" and "transceiver linkages" broadly encompass cellular signals, WiFi, Bluetooth, Zigbee, and radio in general, including digital radio and analog radio. Cellular protocols include GSM, 3D, 4G, LTE, or WiMax, for example. In some instances, "peer-to-peer" or "star" networks are created. "Mesh networks" having no centralized node also may be used. Mesh networks may be homogeneous and heterogeneous, for example employing vehicular units of the invention and other nodes such as are mounted on a remote support vehicle, helmet mounted, or carried in a backpack. Wireless networks, including ad hoc networks in general, are known to those skilled in the art and may be used in communication between devices and modules of the inventive systems. Frequency ranges are generally in the megahertz to gigahertz range, although lower frequencies may be used for longer distances. Each device of a network is assigned an address or identifier for communications. Encryption is optional, but is used for communicating sensitive information such as troop positions and friend-or-foe identification.

"Computer" means a virtual or physical computing machine that accepts information in digital or similar form and manipulates it for a specific result based on a sequence of instructions. "Computing machine" is used in a broad sense, and may include logic circuitry having a processor, programmable memory or firmware, random access memory, and generally one or more ports to I/O devices such as a graphical user interface, a pointer, a keypad, a sensor, imaging circuitry, a radio or wired communications link, and so forth. One or more processors may be integrated into the display, sensor and communications modules of an apparatus of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computers are frequently formed into networks, and networks of computers may be referred to here by the term "computing machine". In one instance, informal internet networks known in the art as "cloud computing" may be used to assist in deploying arrays of unmanned aerial vehicles for surveillance and for search-and-rescue operations, for example.

A "server" refers to a software engine or a computing machine on which that software engine runs, and provides a service or services to a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud. Server farms may be used where a heavy volume of data is exchanged with clients engaged in monitoring arrays (also termed here "swarms") of the vehicles of the invention.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example.

General connection terms including, but not limited to "connected," "attached," and "affixed" are not meant to be limiting and structures so "associated" may have other ways of being associated. "Fluidly connected" indicates a connection for conveying a fluid therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

It should be noted that the terms "may," "can," and "might" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation. The term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense that is as "including, but not limited to."

The appended claims are not to be interpreted as including means-plus-function limitations, unless such a limitation is explicitly recited in a given claim using the phrase "means for."

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

In the following description, and for the purposes of explanation, numerous specific details are set forth in order to provide an understanding of the various aspects of the invention. It will be understood, however, by those skilled in the relevant arts, that the present invention may be practiced more generally. Where known structures and devices are shown or discussed, detail is avoided where not required to differentiate the inventive content. In some cases, a functional description of the operation is sufficient to enable one to implement the various forms of the invention, particularly when the operation is to be implemented in software.

Referring to FIG. 1, a first unmanned vehicle of the invention is shown in directional flight. Thrust is divided into a lift component generally opposing gravity and a vectored component that imparts a horizontal velocity in the X-Y plane. This is achieved by pitch attitude, where the rotating head with rotary-wing assembly is tilted relative to the pendant vehicle body. The vehicle body assembly or fuselage remains generally perpendicular to the horizon, and defines a Z-axis consistent with gravitational force on its mass. Details of the bending action will be described with reference to FIGS. 4, 19, 19, 28 and 35.

FIG. 1 illustrates the unmanned rotary-wing system 100. The depicted embodiment includes a central tubular fuselage or body 300, a head 200 having two rotor counter-rotating wing assemblies, each with one pair of rotor blades 201, 202 fully extended. A "gimballed neck" 400 bendably couples the rotor head to the lower body 300, which may include a payload compartment. Embodiments typically also may include one or more of a communications system or systems, at least one antenna 203, avionics including GPS navigation systems, a sensor or sensors, and a processor with supporting circuitry for executing programmed instructions, coordinating communications, storing data, and so forth, as will be described with reference to FIG. 5. Elements of a payload sensor package may include one or more sensors and are capable of one of relaying, processing or storing data. The systems are typically electrically powered, such as by battery, fuel cell or supercapacitor, but may be rechargeable and may include solar collectors for extended operation once deployed.

Applications may include payload delivery, surveillance, search-and-rescue, or monitoring. The unmanned rotary-wing systems of the invention are capable of being configured and scaled from hand-sized to man-sized for differing requirements. According to their size, they may be launched by one or more methods, including hand-launch, air-drop, catapult, or tube-launch, where tube-launch may include mortar, cannon, air-gun, and grenade launcher, for example. As required, sabot materials are supplied to support artillery launch. Details for gun hardening are described in U.S. Pat. No. 6,347,764, assigned to the US Army, which is incorporated herein in full by reference for all purposes.

The unmanned rotary-wing systems are capable of landing on one of static or dynamic targets, such that dynamic targets include ground vehicles or marine vessels, for example. The unmanned systems are retrievable, re-deployable, and field programmable, or is used once and disposable. Units may be equipped with a parachute for deployment during a "rotors-off" stage of descent, optionally with rotor braking, or may be provided with landing gear that is optionally retractable. Details of suitable landing gear are provided for example in U.S. Pat. Nos. 3,721,405 and 8,172,173 for example, both of which are incorporated herein in full by reference for all purposes. Stake-type landing gear consisting of a single pointed pole mounted vertically beneath the fuselage also may be used to penetrate soft ground during a "rotors off" final stage of descent. When it is desirable to recover the vehicle by flying it to a designated location, the stake is detachable on command after the rotors are brought up to take-off speed and aerodynamic lift and stable trim are established.

Figure 2:
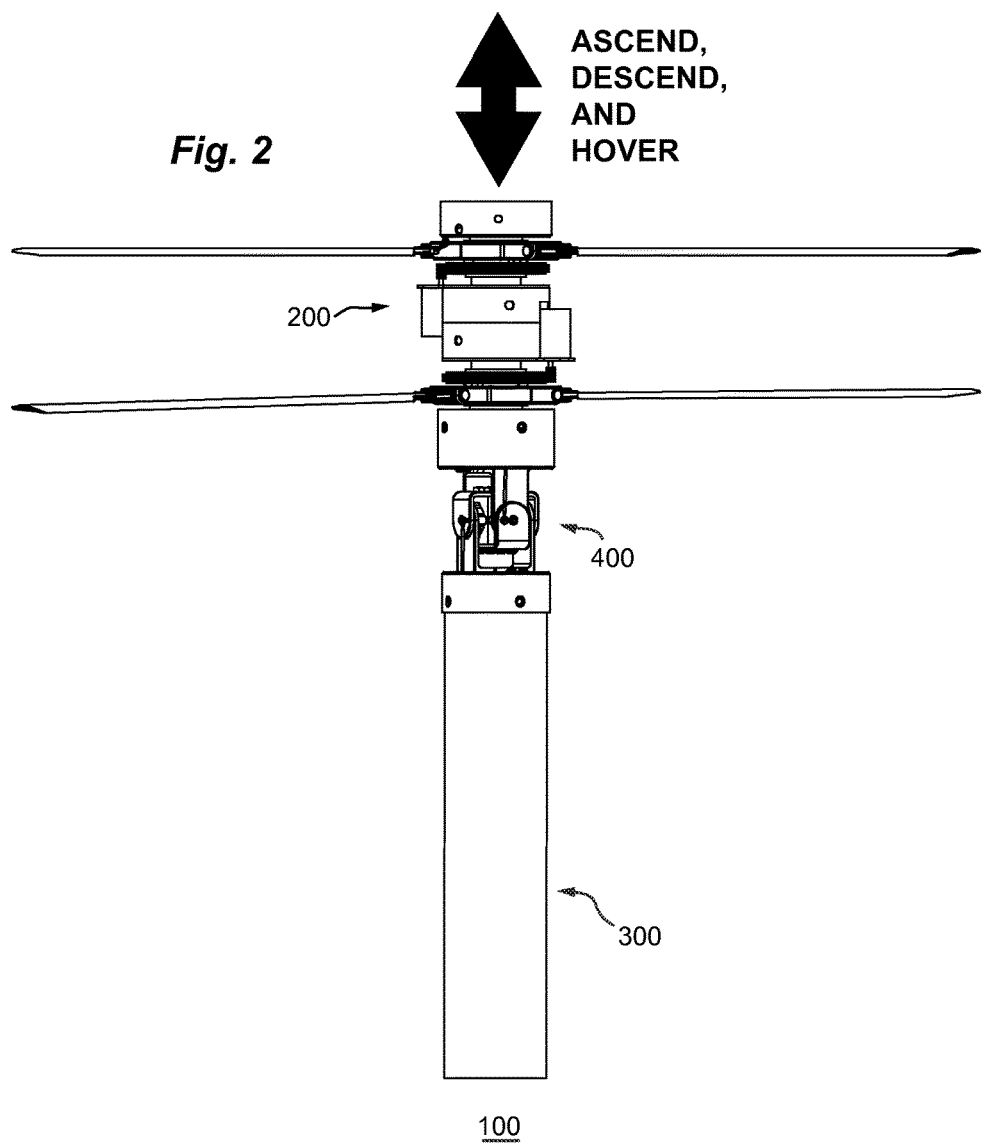
FIG. 2 is a side view of a first unmanned vehicle of the invention.

FIG. 2 is a perspective view of an unmanned vehicle 100 of the invention in a stationary hover maneuver. In this position, the gimbal neck 400 is extended in a straight configuration without a bend or kink and is rigidly braced by an active control system. Unlike a fixed wing craft, altitude for an unmanned fixed-pitch rotary-wing vehicle of the invention is controllable by rotor speed—typically a feedback loop is engineered so that GPS altitude data or a range-finder altimeter is used to monitor altitude at a sufficient frequency so that adjustments in rotor speed can be made while maintaining relatively smooth flight and trim. Generally both rotors (201, 202) revolve at the same speed, but one rotates clockwise and the other rotates anti-clockwise on a common axis. Rotor speed may be synchronized or may be varied to rotate the vehicle.

Figure 3:
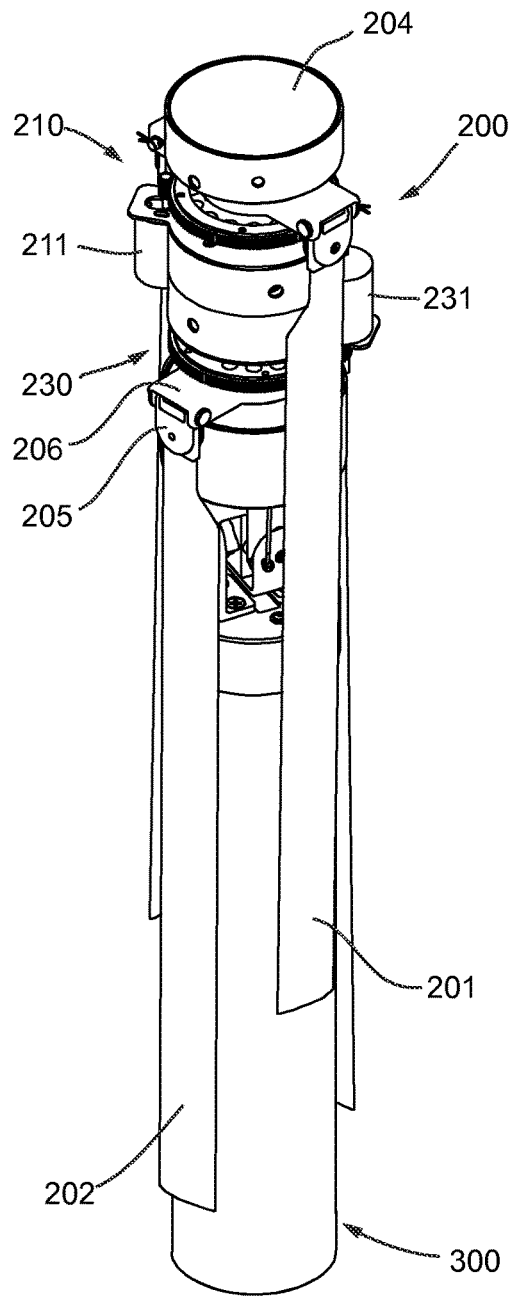
FIG. 3 is a perspective of view of a first unmanned vehicle with rotary-wing elements folded for portability.

FIG. 3 is a perspective of view of a first unmanned vehicle of the invention with rotary-wing elements folded for portability. Rotor pairs 201 and 202 rest against the extended fuselage 300 and can be seen to be hinged at tabs 205 to a rotor mounting yoke 206 rotatably mounted on the rotor head 200. The rotor blades are capable of fully extending, manually or automatically, before or after the vehicle is launched.

In this view, two rotor mechanism assemblies (210, 230) are stacked on a common axis under a rotor head cap 204. Each rotor assembly includes a motor 211, 231 and pinion gear. While the motors are shown as external to the rotor head, the motors also may be placed internally by inverting the crown gear teeth from an external aspect to an internal aspect of the gear ring. Hinge tab 205 pivots in a bracket of the rotor yoke 206 that restrains the rotor from pivoting more than 90 degrees from its position against the body 300.

Figure 4:
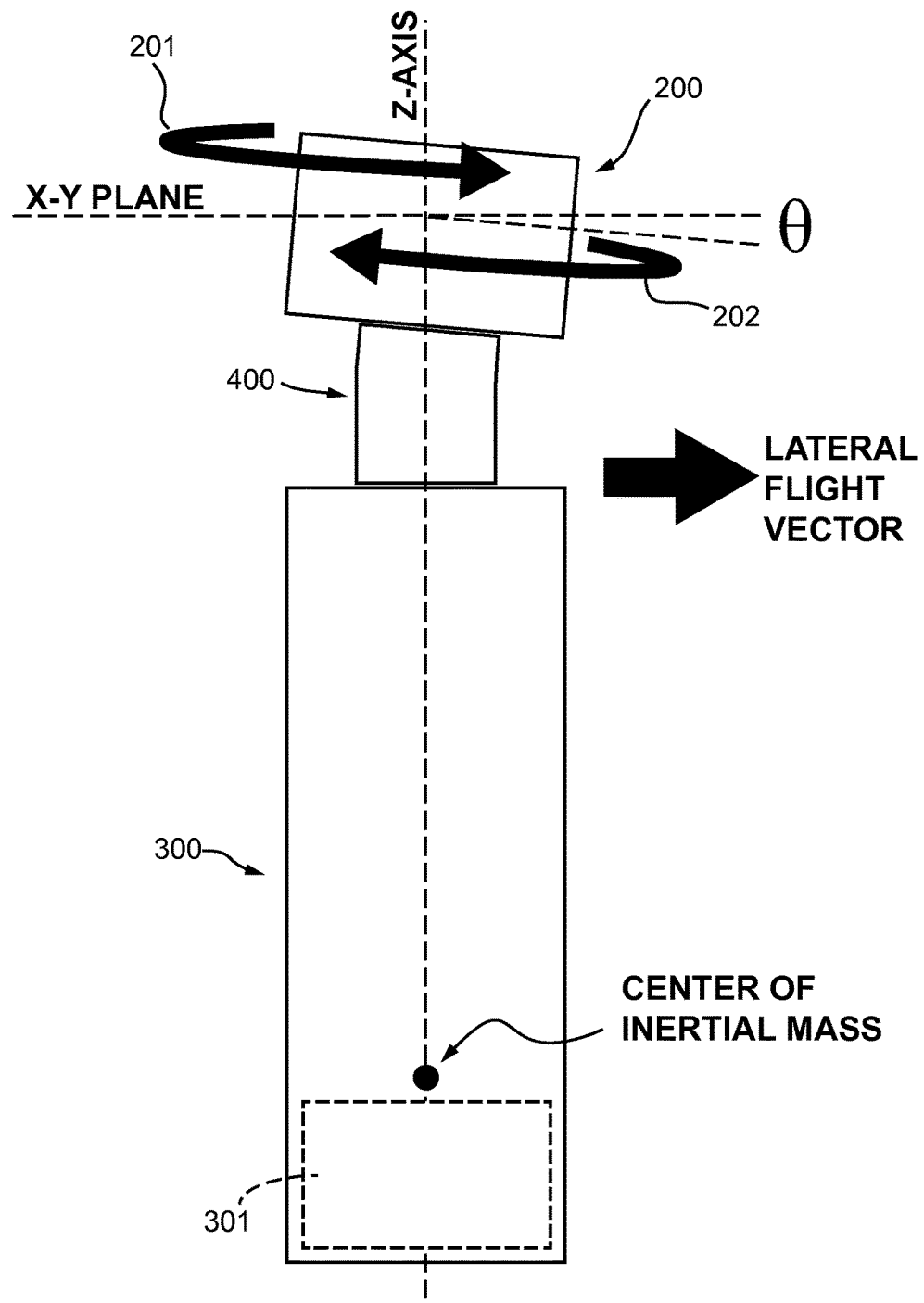
FIG. 4 is a schematic view of functional sub-units of a vehicle of the invention, with gimballed neck joining a rotor head assembly and a lower body assembly.

FIG. 4 is a more generalized schematic of a device of the invention having a rotor head 200, a fuselage lower body 300, and a bendable coupling 400. Rotor head 200 includes a first rotor pair 201 revolving in one direction, shown here schematically, and a second rotor pair 202, shown here schematically, revolving in the opposite direction to cancel rotational thrust.

By applying a bending torque on the gimballed neck coupling the head and the body, the pendulum effect of the body forces the rotor plane out of horizontal. The pitch angle theta divides the lift vector into a lateral component according to the equation:

$$F_L = F_T(\sin \theta)$$

where $F_L$ is the lateral force vector, $F_T$ is total thrust, and $\theta$ is the pitch angle. This is the basis of pitch attitude steering that allows a fixed-pitch rotary-wing device to move directionally with neutral yaw. At 10 degrees pitch, up to 17% of the thrust is directed laterally in this way.

The inventive vehicles may be flown on a defined heading and can be turned both vectorally and around the long axis of the body (yaw). Yaw is controlled for example by causing a voltage differential between the two rotors: one motor spinning faster than the other will cause the vehicle to precess while not changing course. With fixed yaw, pitch attitude controls direction of flight. An inertial measurement unit may be aligned with the X and Y axes of the gimbal so that both axes are controlled independently. Any unique direction in polar coordinates may be achieved by bending the gimballed neck to a particular combination of X and Y angular coordinates. A processor or co-processor is used to solve direction as a combination of X-Y angles to a pair of hinges in the gimballed neck. For these flight maneuvers with a fixed pitch rotor assembly, brushless DC motors are a preferred power source.

The gimbal structure must be rigid in order to apply a torque to the rotor assembly. Biasing means for gimballed necks of the invention include for example actuator rods operated on compound hinges by servo motors, stepper motors disposed for axial rotational control of the hinges relative to each other in at least the X-Y dimensions (where the Z-axis is a vertical axis through the fuselage), and stepper motors with worm gear actuators for "bending" the hinged members so as to kink the gimballed knuckle, as will be described in more detail below.

By controlling just the X- and Y-bending of the gimballed joint, the rotor blade plane of rotation can be pitched in a 360 degree cone around the Z-axis at theta angles up to 10 degrees, more preferably up to 15 degrees such that about 25% of the thrust is delivered laterally. The Z-axis is held for purposes of explanation to be generally vertical relative to the horizon. A greater mass at the base of the fuselage has the effect of lowering the center of inertial mass, resulting in more effective application of torque to the rotor blades and increasing the level of control—up to a point that the inertial mass is too great for effective steering for a given rotor power. Because the vehicles of the invention may be subject to wind gusts and air cells having lower or higher air density, continuous adjustment of pitch attitude may be necessary to maintain a stable heading and altitude. Therefore, the actuators in the gimballed hinges are faster actuators with limited reaction mass, and are controlled by software engineered to adjust the lift and lateral force vectors quickly in response to constant buffeting in the air column during flight. Firmware or software executed by an on-board processor or co-processor may be used to achieve this rapid recalculation and adjustment, which is performed in conjunction with adjustments to rotor speed. Negative feedback loops are engineered so that azimuthal control, altitude control, and pitch control are integrated with sensor inputs necessitating course, altitude or pitch adjustment. Unlike a conventional gimbal, the gimballed neck joints of the invention are made rigid as part of a negative feedback control system of the avionics. In contrast, conventional flight avionics for variable pitch control vehicles are illustrated for example by U.S. Pat. No. 5,058,824 and rely on multiple gyroscopes. Gyroscopes may be used in the vehicles of the invention as flight aids, but are preferably replaced with digital feedback systems having reduced weight and mechanical complexity.

Advantageously and surprisingly, one of the larger masses in the device, the battery assembly 301, may be positioned near the posterior aspect of the fuselage so that by configuring the aspect ratio of the body and rotor diameter, stable lateral flight mode and hover mode may be achieved independent of payload over a useful weight range. Yet more surprisingly, a vehicle having a set of proportions suitable for stable flight may be scaled from hand-sized to man-sized with conservative changes in body and rotor aspect ratios and lift-to-load ratios. These devices are constructed with a gimballed neck that is inexpensively constructed and replaces the delicate and difficult to maintain variable pitch control systems of devices of the prior art. These couplings are both relatively easy to miniaturize, and may be built to sustain larger payloads in man-sized devices. By using the battery as a ballast weight, payloads may be delivered and the vehicles may fly back empty to be re-used without the need to modify the rotor pitch. This is an unexpected advance in the art. In one instance the payload compartment is a slide-out compartment or section and the fuselage includes a rigid rib or backing that supports the battery in relation to the rotor head with or without the payload compartment in place.

Figure 5:
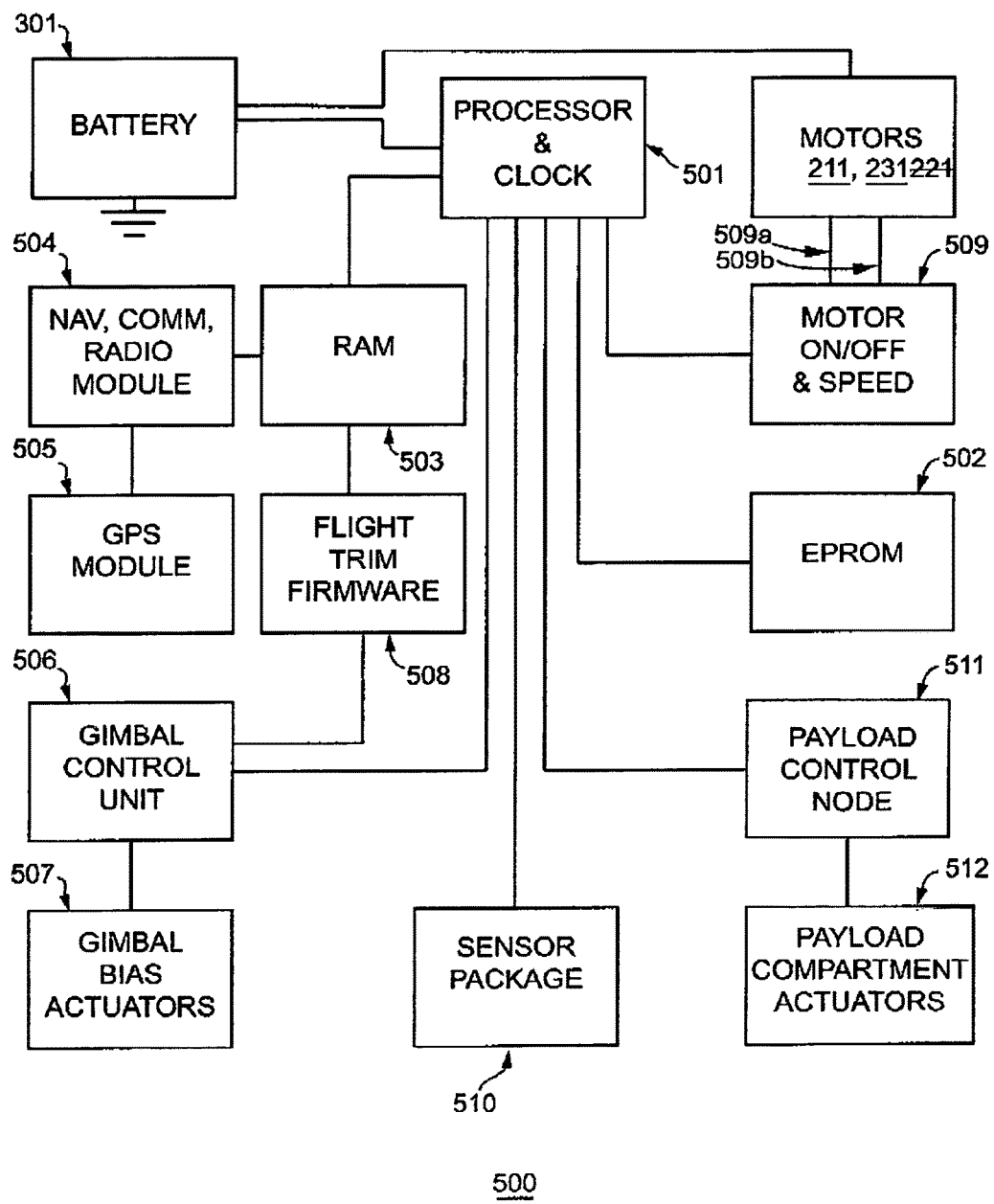
FIG. 5 is a block diagram of digital and analog systems of a vehicle of the invention.

FIG. 5 is a block diagram of digital and analog systems of a vehicle of the invention needed for flight operations. The systems include at least one processor 501, typically operating with a faster clock and 16, 32, 64 or 128 bit data at speeds of 20 MHz to 200 GHz, depending on the performance/cost ratio of the system. The processor is supported by RAM 503 and by EPROM (or a related read-only memory technology) 502 for storing programming instructions. Co-processors may be used for mathematically intensive calculations if needed, such as for flight trim and stabilization.

Power supply 301 is generally a lithium ion or lithium polymer battery, but may use other battery chemistry known in the art. Lithium polymer (LiPo) batteries have evolved from Lithium-ion battery technology, with the electrolyte held in a solid polymer composite, replacing a metal casing with a flexible polymer foil casing to reduce battery weight. Advantageously, LiPo batteries can be more flexibly shaped so as to be configured around other systems in the fuselage. LiPo batteries offer an almost 20% increased energy density over lithium ion batteries and increased resistance to physical damage. Fuel cells and supercapacitors may also be used in place of or to supplement a battery.

Flight is generally GPS-controlled as for direction and destination and GPS also may be used to establish positional tolerances for vehicles flying or hovering in an array. The operator may establish waypoints prior to launch or, in some embodiments, may supply coordinates in flight. The technology for GPS navigation of this kind is generally well known and is described for example in U.S. Pat. No. 8,178,825 and US Pat. Publ. Nos. 2005/0051667 and 2009/0212157, each of which is herein incorporated by reference in full for all purposes. The GPS module 505 is generally digitally coupled to the navigation module 504 and RAM and is also linked to the comm unit for position stamping of telemetry.

Optionally, flight trim firmware 508 may be used to control near-instantaneous responses to flight variations. Optionally a co-processor (not shown) linked to the flight trim firmware and RAM will perform calculations in support of gimbal bias actuators 507, which are typically performed in real time at high data rates. The flight trim unit is typically tied to the GPS module via RAM and when firmware elements 508 are not present, the processor will control the gimbal bias unit 506 directly using GPS or other positional and altitudinal data. Flight control may be adaptive flight control and requires a data intensive flight controller architecture capable of rejecting shock and dislocation by wind and turbulence. The avionics architecture supports rotary-wing VTOL vehicles typically weighing less than about 100 kg and having a hover flight mode in which the rotor(s) produce a lifting force and the lifting force is divided between a vertical thrust and a lateral thrust by pitch attitude flight control systems mediated by a controllable gimbal-structured actuator system. In some instances, flight control is network based. In other instances, particularly for vehicles having lift-to-payload ratios of less than one, flight control is limited to controlled descent maneuvers as described below.

Communication and sensor systems are disclosed for example in US Pat. Publ No. 2009/0212157 and include systems known in the art. Navigational and targeting systems are disclosed for example in U.S. Pat. No. 8,178,825. Control, navigation, and communication systems are further elaborated in US Pat. Publ. No. 2005/0051667. These patent documents are herein incorporated in full by reference for their relevant teachings. Any variety of radio communications may be used, and may include Zigbee, cellular signals, WiFi, Bluetooth, and radio in general, including digital radio and analog radio. Cellular protocols include GSM, 3D, 4G, LTE, or WiMax, for example, as are known in the art. Frequency ranges are generally in the megahertz to gigahertz range, although lower frequencies may be used for longer distances. Each device of a network is assigned an address or identifier for communications. Encryption is optional, but is used for communicating sensitive information such as troop positions and friend-or-foe identification. In some instances, "peer-to-peer" or "star" networks are created between one or more vehicles of the invention. "Mesh networks" having no centralized node also may be used. Mesh networks may be homogeneous and heterogeneous, for example employing units of the invention and other nodes such as vehicle mounted, helmet mounted, or carried in a backpack, for example. Wireless networks, including ad hoc networks in general, are known to those skilled in the art and may be used in communication between devices and remote workstations and between functional modules within the inventive vehicles and systems. The vehicles may include transceivers for a plurality of radio bands and suitable antennae under control of a single processor or one or more co-processors. Depending on the radio band and transmission range, antenna may be coiled or dished in a navigation and communications superstructure atop the rotor head, or may be built into the structure of the fuselage, and in fact, may extend past the fuselage such as in the form of a whip antenna dependent therefrom. While some vehicles are configured to operate with a higher level of independence, network control means may also be employed.

Motors 211 and 231 (for duplex rotor systems) are generally high-speed light-weight motors and are known in the art. Processor control of the motors includes an ON/OFF switch and speed control 509. Optionally, motor control may be executed in conjunction with flight trim firmware or by software-driven commands originating from on-board systems, from a network, or from a remote control workstation, although in a preferred embodiment, high level commands are sent to the vehicles and the detailed adjustments needed for stable flight are executed following local instruction sets that may include pre-programmed targeting instructions.

Other systems are also optional. These may include control 511 of payload compartment doors, latches, ejection systems or other fittings 512, and may be required for ejection or unloading of munitions or supplies on target. Other systems include parachute actuators, rotor brakes, and systems not necessary for general flight operations.

A sensor package may be included with the payload, or may be the payload, and may be interchangeable. Sensor packages may also be built into the fuselage or the rotor head.

The sensor package 510 may be complex, and may include more than one module. Where cameras are involved, several types may be mounted to optimize image collection, including night vision sensors or infrared imaging systems to complement visual imagery collection. Imagery generally is linked to data transmission such as upload to a satellite platform or cloud-based image processing network. While GPS sensor data is considered separately, sensors for detecting and interpreting positional clock data from global positioning satellites (GPS), altitude data from altimeters, range-finding data for targeting and wayfinding may be complementary and may be integrated with navigational and flight control. Other sensor systems are intended for data acquisition in support of surveillance or search operations, and also data from specialized sensors enabled for collecting sounds and sound patterns, wind speed and direction, humidity and precipitation, temperature, weather-related data generally, motion sensors for detecting movement of troops, refugees, vehicles, vessels and so forth, infrared sensors, smoke detectors, radiation sensors, radar signal detectors, sensors for detecting and triangulating signal transmissions, chemical sensors such as for urea and uric acid, or Sarin and VX nerve gas, or biological agents, and sonographic sensors that include acoustic pulse generation and pulse echo detection instrumentation and passive listening for operation when immersed in a body of water, while not limited thereto. Some sensor data is processed on board, other data is transmitted to central facilities for more detailed analysis.

Figure 6:
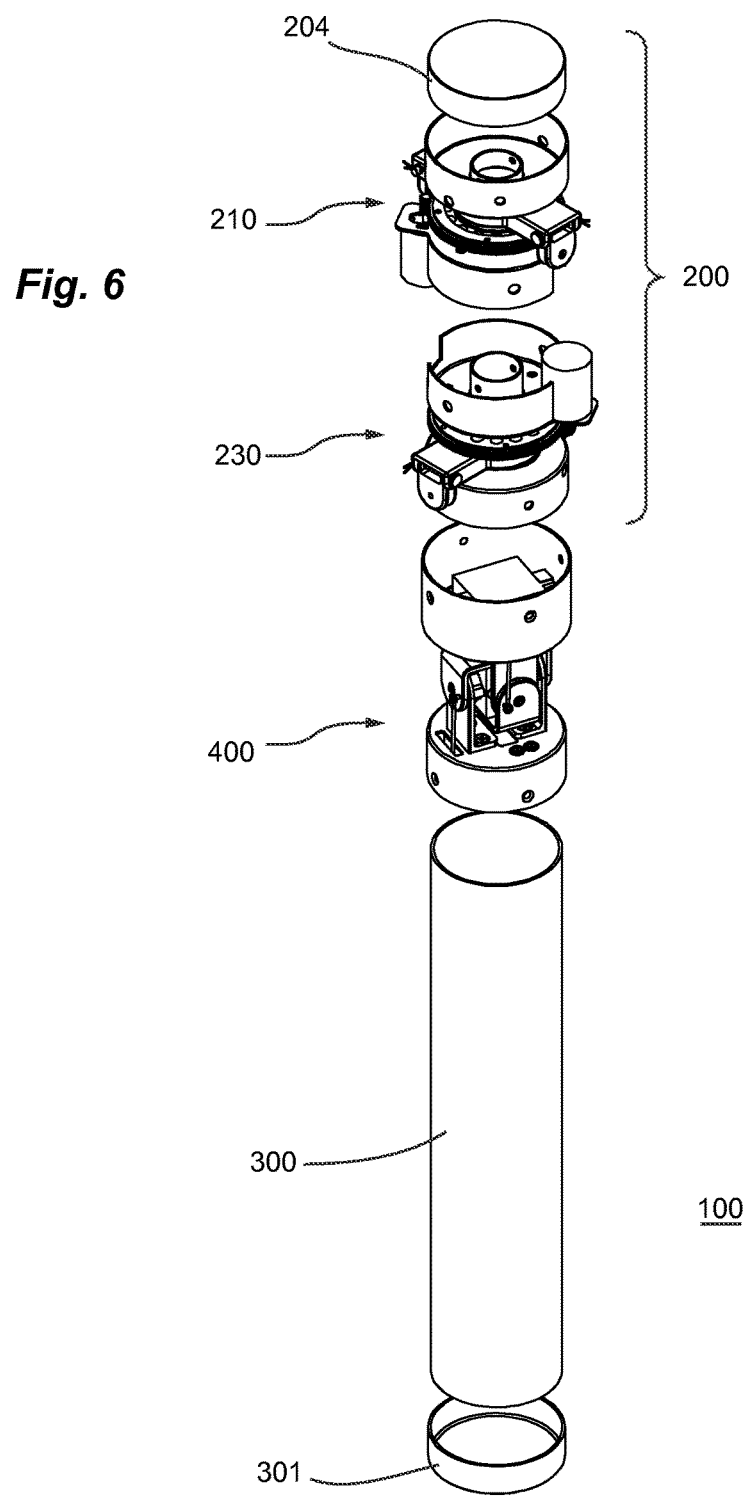
FIG. 6 is an exploded view of the fuselage with rotor mechanism.

FIG. 6 is an exploded view of the fuselage with rotary-wing system structure, and depicts the mechanism with rotor blades omitted for clarity. Shown are two stacked rotor mechanism assemblies (210, 230) forming a rotor head 200, one gimballed neck assembly 400, a tubular lower body 300, and two end caps (204, 301).

The two rotor mechanism assemblies are stacked "head" to "head" instead of head-to-bottom. This has the advantage that one electrical signal can be sent to power both motors in opposite directions, and only the voltage need be varied to independently vary rotor speed. Alternatively, the two rotor assemblies may be stacked in the same orientation and the power waveform may be inverted to drive the lower rotor in an opposite direction from the upper rotor. In other embodiments, planetary gears may be used to distribute power to the two rotor systems, but use of canned motors instead of a transmission system reduces weight.

Figure 7:
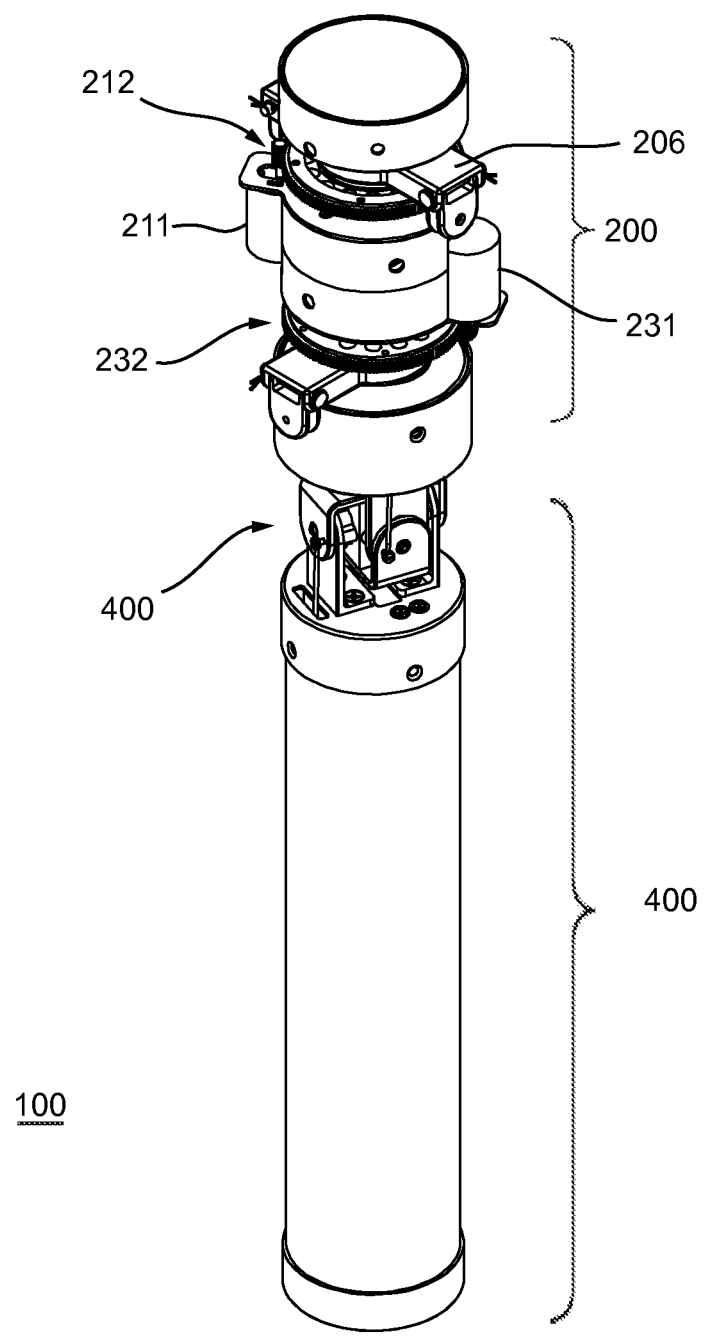
FIG. 7 is a perspective view of an assembled fuselage.
Figure 8:
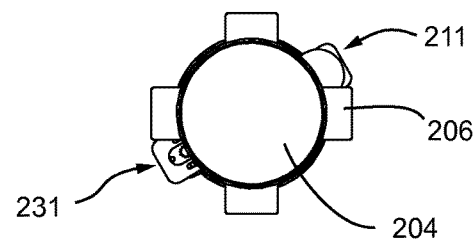
FIG. 8 is a top plan view of the fuselage.

FIG. 7 is a perspective view of an assembled fuselage or lower body 300 and rotor head 200 of an unmanned vehicle 100 of the invention. Rotor blades are omitted for clarity. The motors are generally disposed axisymmetrically on the body as shown in FIG. 8 to balance weight in this dual rotor system and are thus inverted with respect to each other. While the rotors may be externally mounted as shown here, in other embodiments the drive gear teeth may be internal and the motors may be mounted within the rotor head housing.

Figure 9:
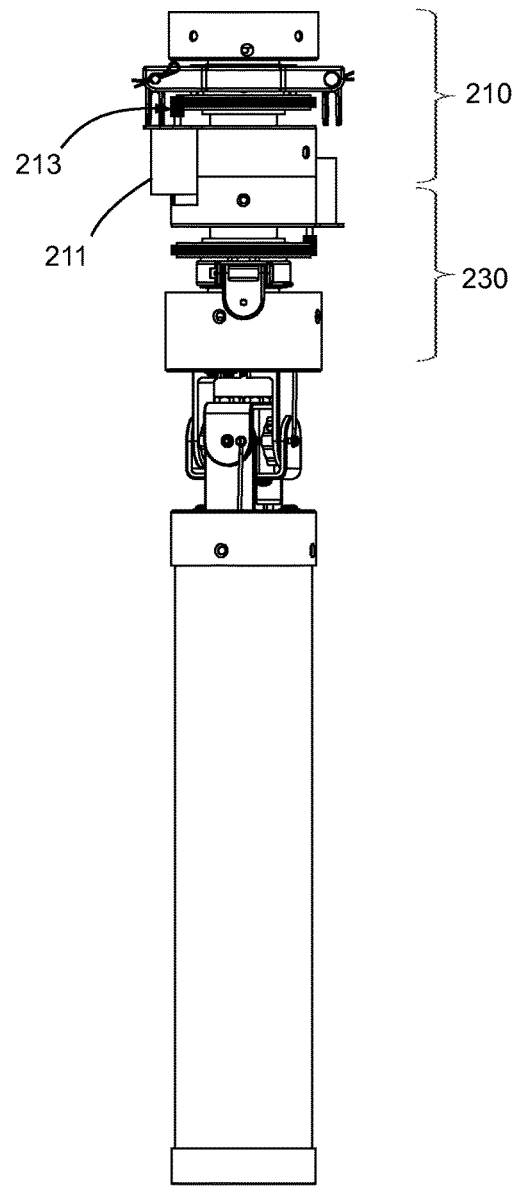
FIG. 9 is an isometric side view of an assembled fuselage.

FIG. 9 is an isometric side view of an assembled vehicle system and shows that the two rotor mechanism assemblies 210, 230 are co-axially mounted head to head. The two rotor assemblies are otherwise essentially interchangeable but are inverted with respect to each other on a common center shaft 222 drawn in FIG. 10. The center shaft extends from upper cup fitting 214 to lower cup fitting 215 and supports a bearing assembly 216 that is held in place using set screw 217, which extends through the cup fitting housing and impinges on center shaft 222. The rotating hub (termed here the "spinner, 218) of the rotor assembly rides on these bearings, which consist of needle bearings surrounding the center shaft and thrust bearings at either end. When secured on the shaft, the rotor mechanism assembly is sandwiched between the two end cup fittings and the blades rotate with the spinner on the bearing race 216. The shaft 222 extends through both rotor assemblies (210, 230), including stationary motor mounting bracket 219, gear mounting plate 220, rotor mounting yoke 206, and is held in compression fit. Rotary wings are affixed to the rotor mounting yoke 206 using quick connect pins 221 inserted through hinged tabs (205a, 205b). While a duplex rotary wing or blade structure is indicated, triple or quad rotors also may be used if desired. The shaft also may serve as a wiring harness conduit. Antenna and comm circuitry may be placed within the uppermost cup fitting if desired.

Figure 10:
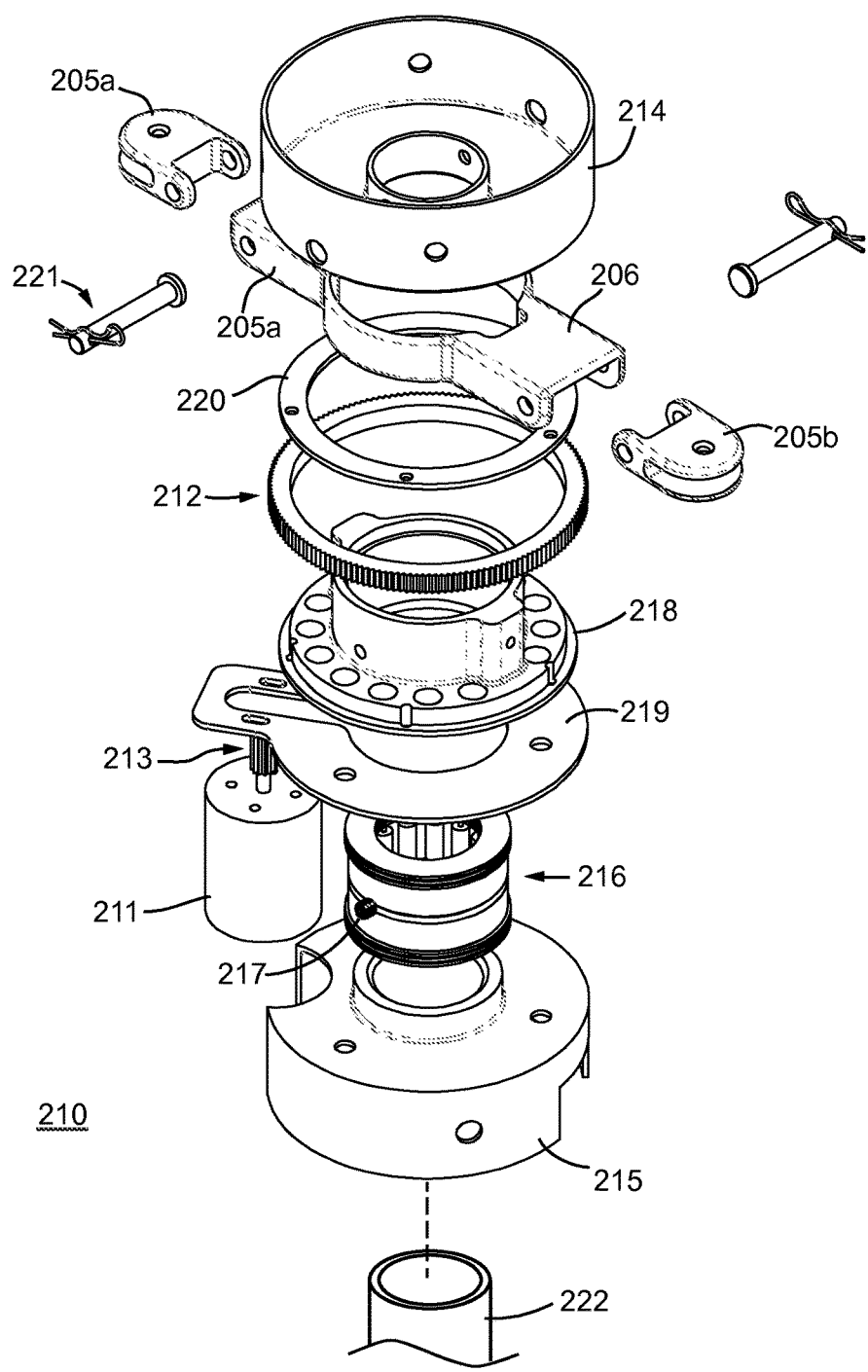
FIG. 10 is an exploded view of the rotor mechanism assembly.
Figure 11:
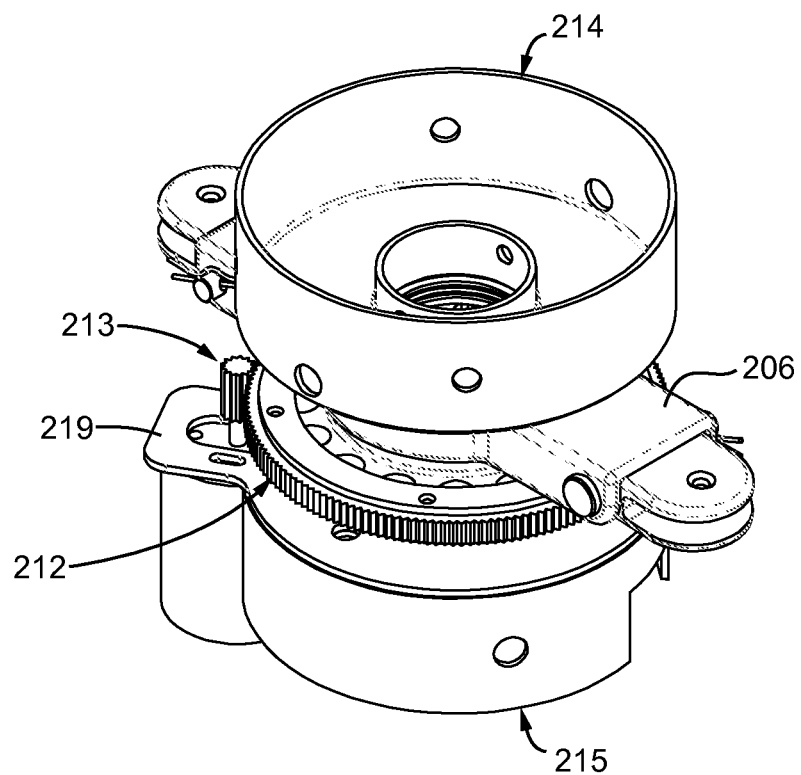
FIG. 11 is a perspective view of one assembled rotor mechanism assembly unit.

The exploded view of FIG. 10 corresponds to the rotor mechanism assembly view of FIG. 11, where the compactness of the structure is indicated. In the depicted embodiment of FIG. 11, each rotor mechanism assembly is 2.94 inches in height. Motor pinion gear 213 engages the drive gear 212, which rotates the spinner 218 and rotor yoke 206 on a stationary center shaft while compressed between the two end cup fittings (214, 215). The motor 210 is mounted on a bracket 219 that is affixed to cup fitting 215. Set screws hold the cup ends in place. The second rotor assembly 230 is fitted to rotor assembly 210 on a common center shaft 222 in an inverted orientation, but is otherwise analogously assembled and operated.

Figure 12:
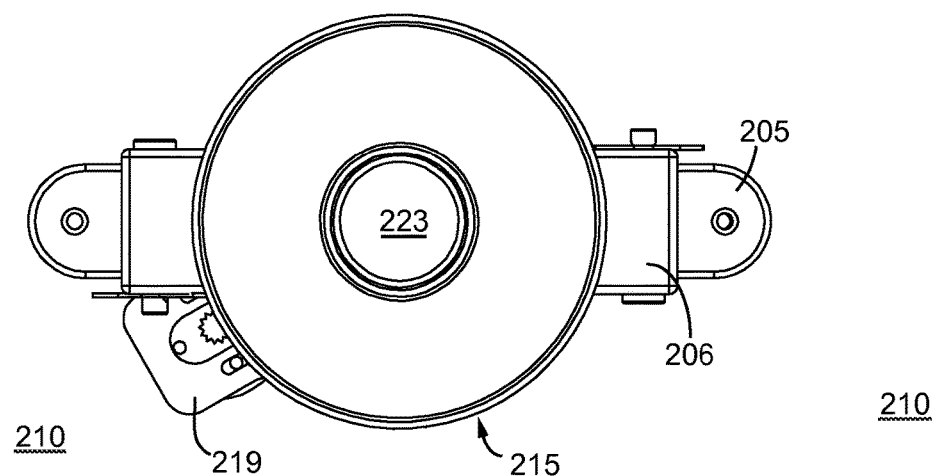
FIG. 12 is a bottom view of the rotor mechanism assembly, showing rotor blade attachment hubs.

FIG. 12 is a bottom view of the rotor mechanism assembly 210 showing rotor blade attachment yoke 206 and hinge tabs 205. Also shown is motor mounting plate 219 and hole 223 through the end cup 215.

Figure 13:
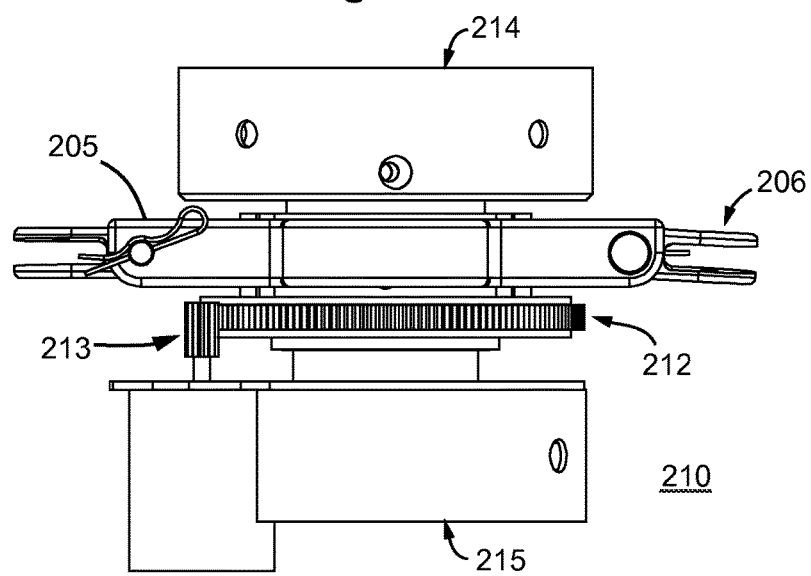
FIG. 13 is an isometric side view of the rotor mechanism assembly showing rotor blade attachment hubs and master drive gear and pinion.

FIG. 13 is an isometric side view of the rotor mechanism assembly showing rotor blade attachment yoke 206, upper drive gear 212 and pinion gear 213 sandwiched between cup fittings 214 and 215. The depicted embodiment has an outer diameter of 3.13 inches.

Figure 14:
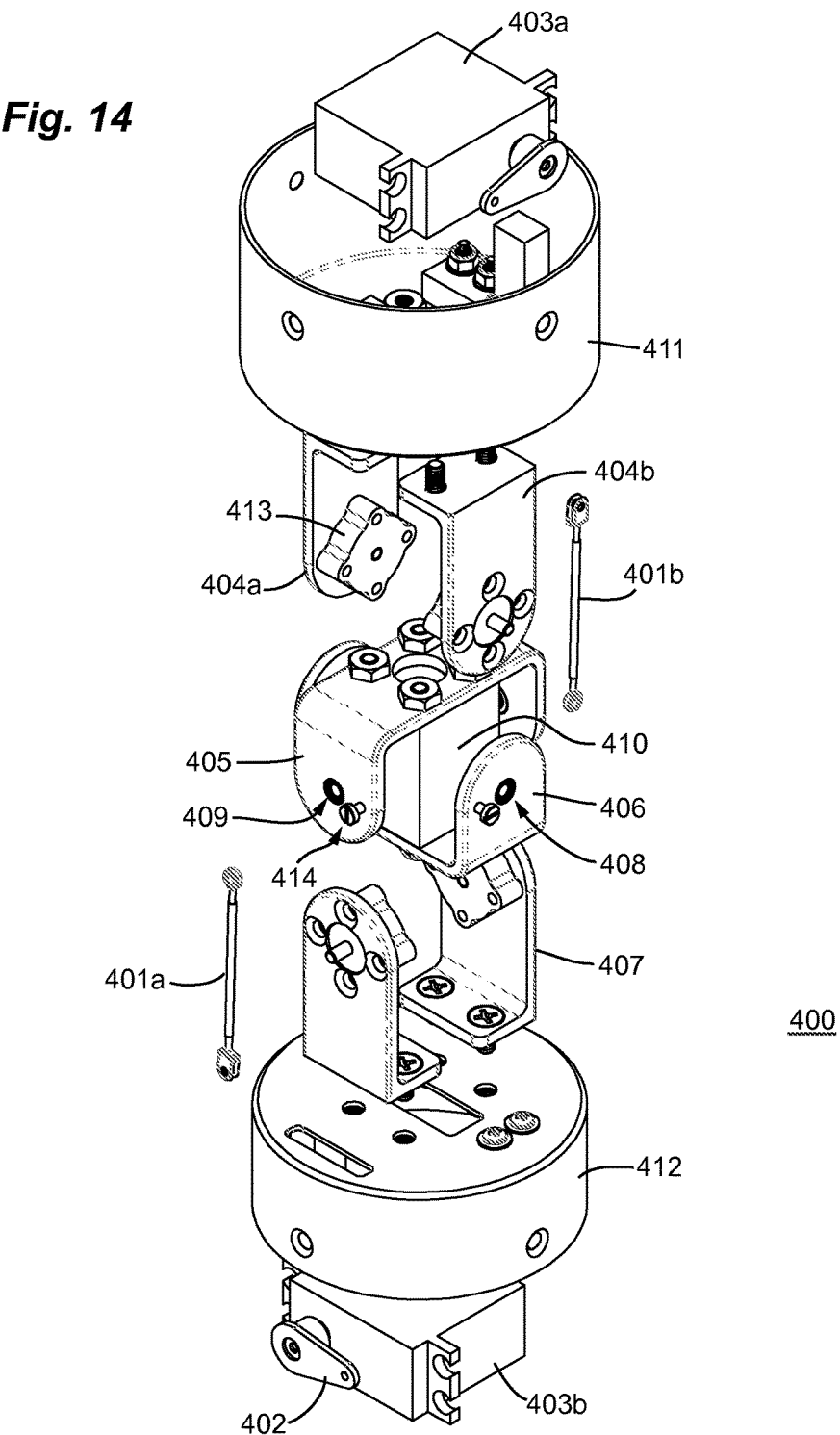
FIG. 14 is an exploded view of a first gimbal neck assembly with servos and actuator rods.

FIG. 14 is an exploded view of a first gimballed neck assembly. Flexure of the gimballed neck is actively controlled as part of flight control operations and thus the "gimbal" is not a conventional gimbal for neutralizing rocking and turning motions. Instead, two actuator rods 401a,b with connecting linker arms 402 are biased by servo motors 403a,b. The servo motors and linker arms are responsible for rigidifying the gimballed joint and executing X and Y bending commands from the avionics to bend the neck. Bending the neck causes an inertial shift in the center of mass of the lower fuselage as controls the pitch attitude of the rotors. This joint has the advantage that simple X and Y movements of the actuator arms may be used to position the rotor pitch at a useful theta angle over a 360 degree circle from the Z-axis. The neck does not flex passively.

Four pairs of pivot brackets (404, 405, 406, 407) make up the gimballed joint, which has two pairs of pivot axle pins (408, 409) and a center standoff 410 that is rigidly affixed to the middle pivot brackets. Pivot axle pins are affixed with set screw hubs 413. The upper and lower brackets 404 and 407 are rigidly affixed to end cups 411 and 412 respectively. Middle pivot brackets 405 and 406 pivot on axles 408 and 409 and are coupled to actuator rods 401a,b through actuator coupling pins 414.

Figure 15:
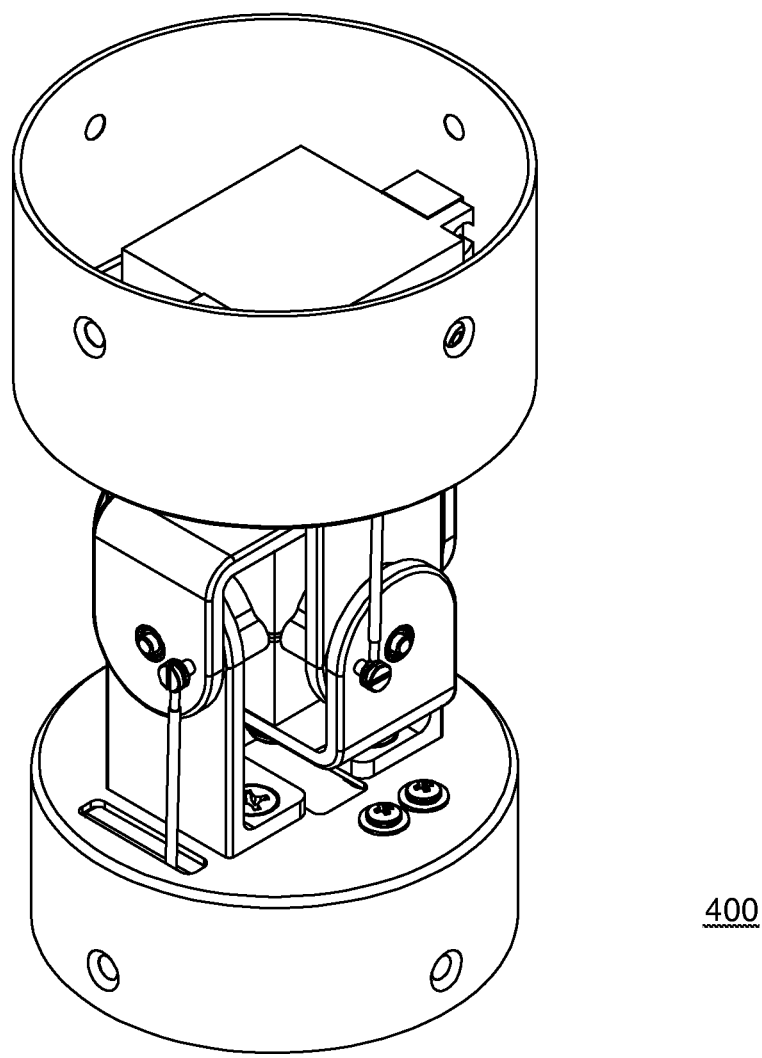
FIG. 15 is an assembly view in perspective of a first gimbal neck.
Figure 16:
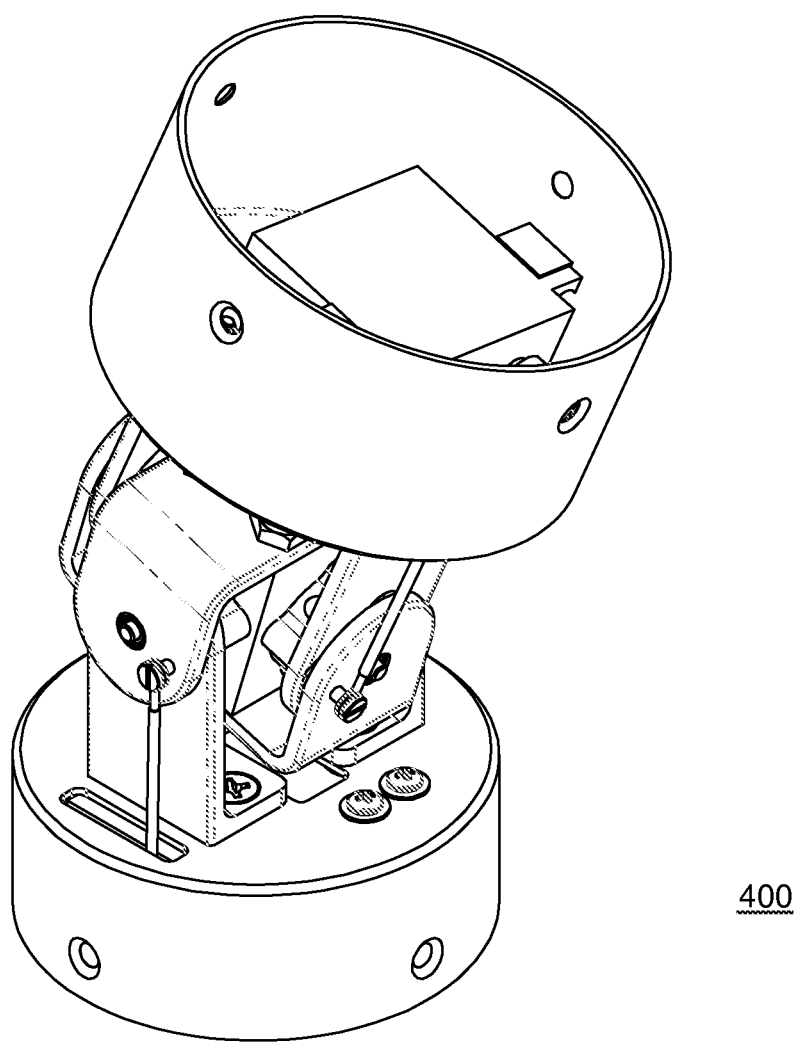
FIG. 16 is an assembly view of a gimbal neck of FIG. 15 with angulated bend.

FIGS. 15 and 16 are perspective views comparing the gimballed neck 400 in a vertical straight configuration versus a "bent" or "angled" configuration. Servos are under control of the gimbal control unit or module 506.

Figure 17:
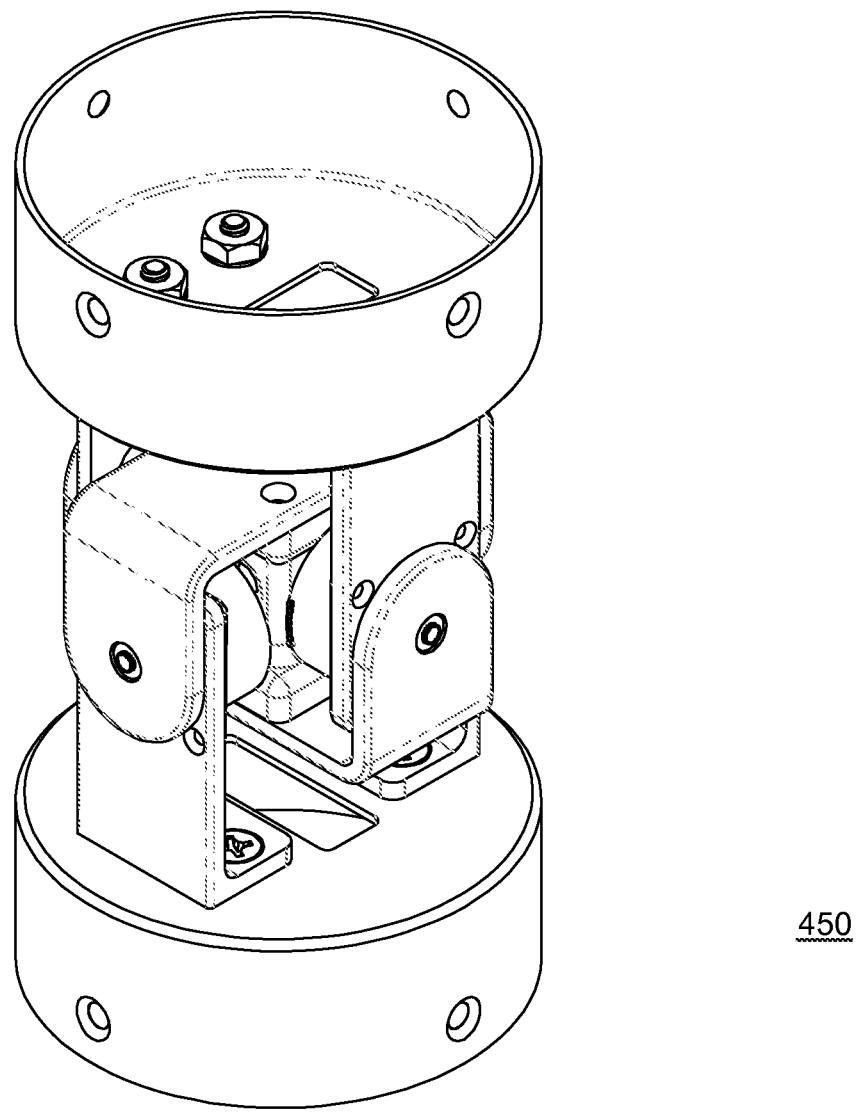
FIG. 17 is an assembly view of a second gimbal neck with integral bending control.
Figure 18:
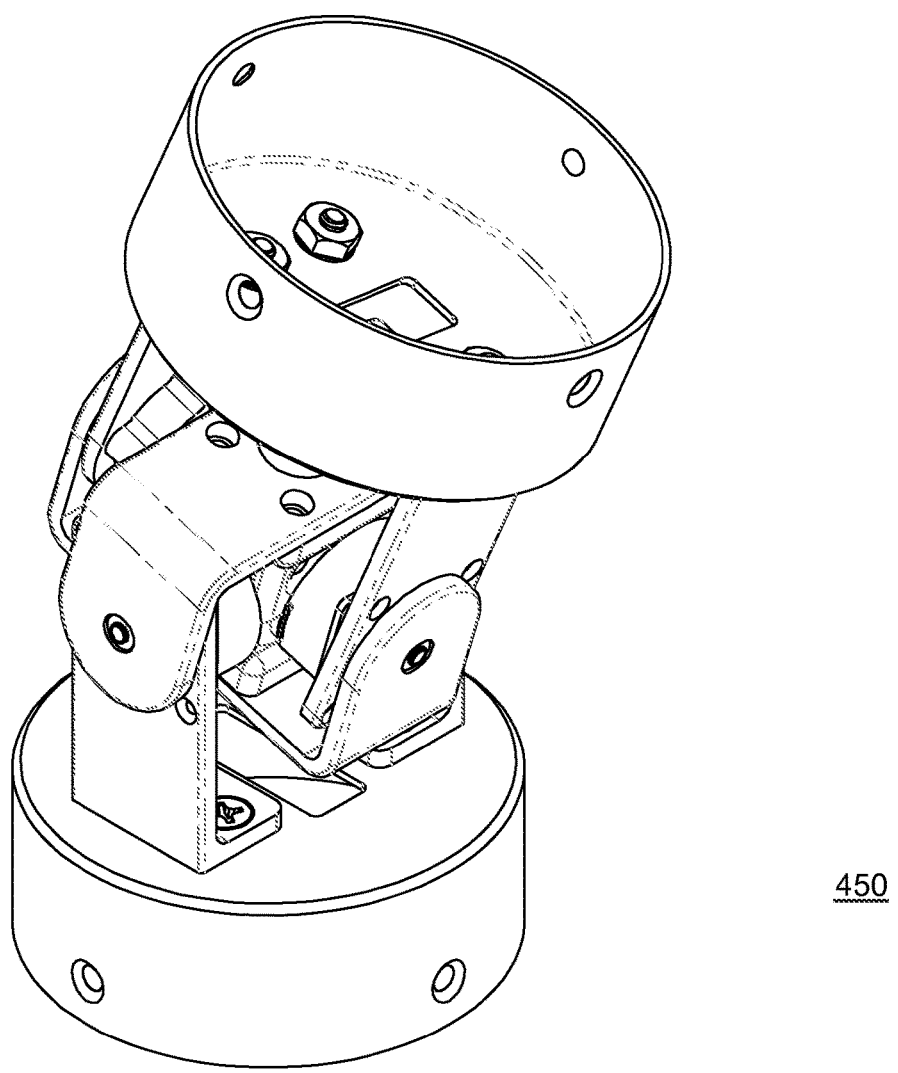
FIG. 18 is an assembly view of the gimbal neck of FIG. 17 with bent neck.
Figure 19:
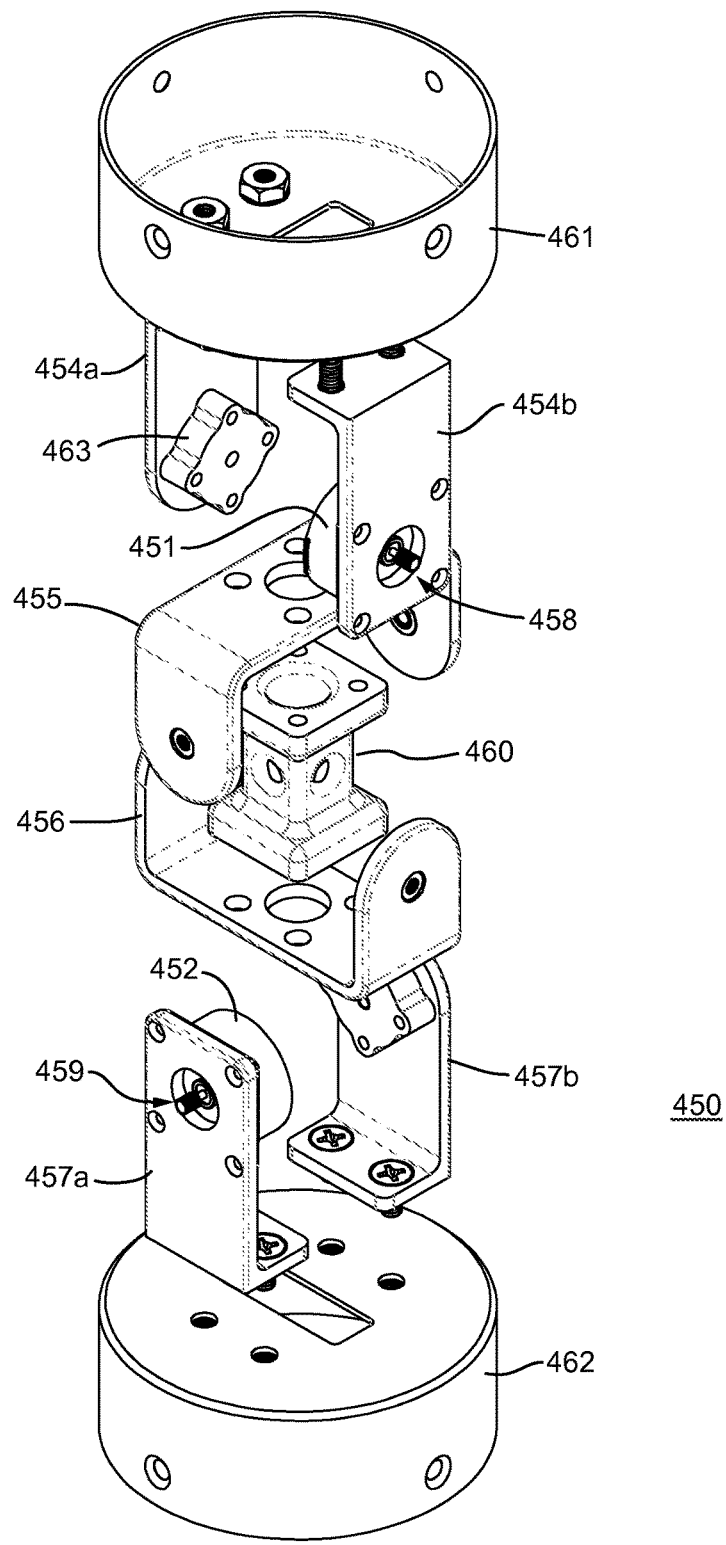
FIG. 19 is an exploded view of a gimbal neck using integrated stepper motors for bending control.

FIGS. 17 through 19 are perspective views of an alternate embodiment of a gimballed neck for steering an unmanned aerial vehicle with fixed pitch rotors. In FIGS. 17 and 18, the neck 450 is shown in a straight versus a bent configuration. FIG. 19 discloses that control of the gimbal joint may be achieved with stepper motors 451, 452 in place of actuator rods and servos. The stepper motors are inserted into two pivot axles of the gimbal hinges, allowing the upper cup fitting and the lower cup fitting to flex.

Shown are gimbal brackets 454a, 454b, 455, 456, 457a and 457b. Also shown is center standoff 460 (attaching bolts not shown), upper cup 461, lower cup 462, an upper gimbal pivot axle 458, and a lower gimbal pivot axle 459 with set screw hubs 463. Also shown are axle-mounted stepper motors 451, 452 that are wired to receive electrical pulses in response to commands from gimbal control unit 506. Using coordinated commands, any range of theta angle over 360 degrees of rotation can be achieved. This permits pitch attitude control of direction in a fixed-pitch rotor vehicle. The neck does not flex passively as a conventional gimbal.

Also disclosed is a combination having a gimballed neck and a variable pitch rotor for added flight agility and speed. Variable pitch rotors are known in the art and are described for example in US Pat. Doc. Nos. U.S. Pat. No. 7,789,341, U.S. Pat. No. 8,146,854, U.S. Pat. No. 8,469,307 and U.S. Pat. No. 5,058,824, the teachings of which are herein incorporated in full by reference.

In a second aspect of the invention, unmanned aerial vehicles may be deployed in formations and arrays, advantageously so as to perform search and mapping functions or to serve as fixed position sensors in complex topological grids on land or sea. Once deployed, local peer-to-peer or mesh communications networks may be linked to satellite or remote workstations or servers at which sensor data is processed. These arrays may be linked to provide any kind of sensor data to networks of computers, such as for humanitarian or military missions. In this embodiment, the unmanned aerial vehicles of the invention are not necessarily limited to those having a gimballed neck, but in a preferred embodiment utilizing the unmanned aerial vehicles of the invention, vehicles will be supplied with the rotor head and fuselage body coupled by a gimballed neck as shown in FIGS. 1-19, 28 and 35.

When deploying unmanned vehicles in a plurality, a vehicle will be designated as a queen wherein the queen is defined as a single dominant vehicle and is equipped with a long range communications system up to and including satellite telemetry to permit worldwide access to the swarm if desired. Suitable telemetry systems include but are not limited to the IRIDIUM satellite network, cellular wireless networks, and radio systems for example. The remaining vehicles will be designated as the swarm wherein the swarm vehicles are defined as a plurality of slave vehicles and will be equipped with either long range or short range communications systems and will be configured to function in a local network mode. The queen will be controlled from a remote control workstation and will relay commands to the swarm and data from the swarm.

In a preferred embodiment, formations are deployed with a queen vehicle and a plurality of swarm vehicles, where only the queen relays information to the remotely operated ground control station. A centralized communication hub to and from the array reduces network traffic and can be sized to handle the required bandwidth without slowing communications, typically by multiplexing data at a high rate of speed or using multiple bands such as one band for command syntax and another band for data relay. Similarly, separate bands may be used for local network comm functions. Generally, each queen serves many swarm vehicles. However, one or more back-up queen vehicles in the formation may be equipped with long range communications capabilities such that they may take the place of the queen in the event of a malfunction, or if all or part of the swarm becomes out of radio range.

Thus the queen may include multiple radio bands and suitable antennae under control of a single processor or one or more co-processors. Depending on the radio band and transmission range, antenna may be coiled or dished in a navigation and communications superstructure atop the rotor head, or may be built into the structure of the fuselage, and in fact, may extend past the fuselage such as in the form of a whip antenna dependent therefrom.

Figure 20:
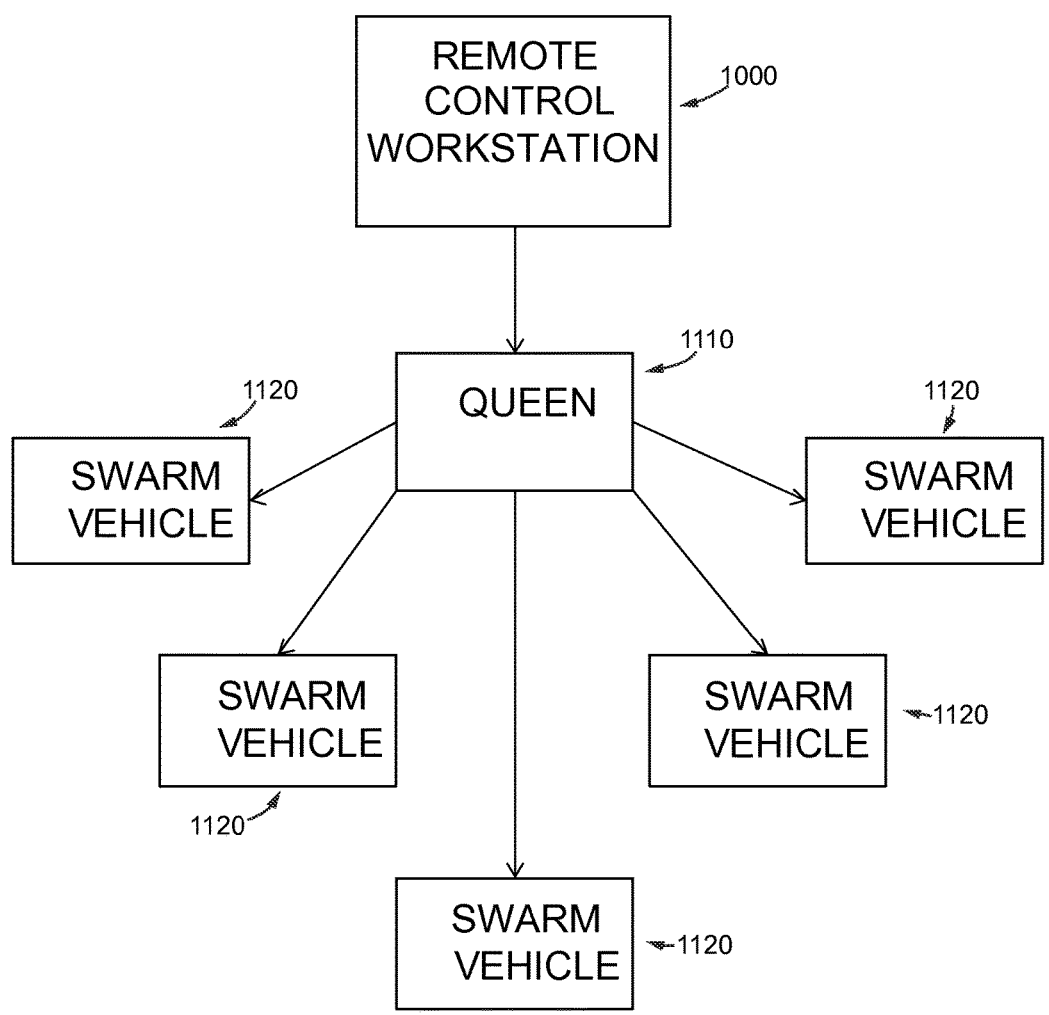
FIG. 20 depicts a system command structure for deploying unmanned rotary-winged vehicles in an array formation.

FIG. 20 depicts a system command structure for deploying unmanned rotary-winged vehicles in an array formation. The remote control workstation (RCW) 1000 transmits commands to the queen 1110 which then relays commands to the swarm vehicles 1120. The queen 1110 may be equipped with a long range communication system and the swarm vehicles 1120 may be equipped with either long range or short range communications systems. Each formation will be comprised of a single dominant queen 1110 and a plurality of swarm vehicles 1120 and will be controlled from a remote control workstation. Each formation also may include a backup queen or queens wherein the backup queen or queens are fully functional queen vehicles that are initially designated as swarm vehicles. In some embodiments, all of the swarm vehicles may be backup queens. Software (in on-board EEPROM or in network systems logic) is generally used to designate an order of priority in the event a queen must be replaced. Special command codes direct to a swarm vehicle or vehicles may be used to override queen-based communications and designate a new queen.

The backup queen or queens are fully functional queens initially designated as swarm vehicles. Thus the queen functions as a network hub for command and control, and may function interchangeably with swarm vehicles having identical structure or may be a specialized vehicle having communications systems not found in swarm vehicles. Redundancy in command systems may be achieved by supplying backup queens, or by supplying all systems with full communications capability that is disabled unless needed. Command structures are achieved using telemetry between the remote control workstation and the queen, and commands to the swarm are relayed from the queen to individual swarm members so that the swarm may act en masse and in unison or may act with each swarm member behaving independently. Similarly, data from one or more swarm members is communicated to the queen and from there, according to scripted communication protocols, to the remote workstation.

Figure 21:
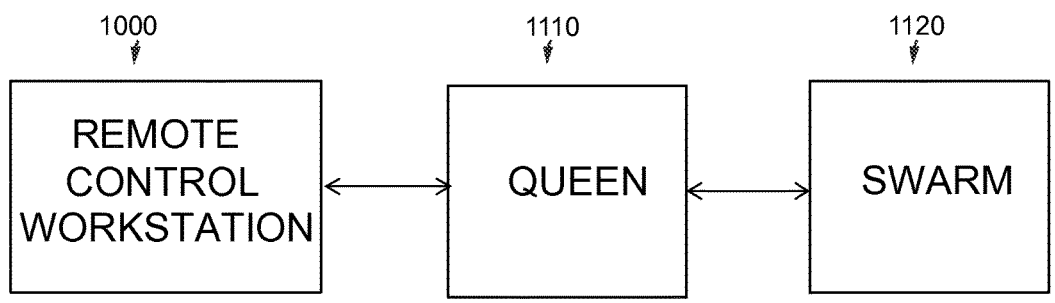
FIG. 21 depicts communication between swarm vehicles and a remotely operated workstation via an intermediate queen vehicle.

FIG. 21 depicts communication between swarm vehicles and a remote control workstation via an intermediate queen vehicle. The remote control workstation 1000 transmits commands to the queen 1110, which then relays the commands to the swarm vehicles 1120. The swarm vehicles 1120 may be equipped with various sensors. Should the sensors be capable of transmitting data in real-time, the data will be transmitted from the swarm vehicles 1120 to the queen 1110, which will then relay the data to the remote control workstation 1000.

Thus the invention also may comprise a system for deploying unmanned vehicles having a queen where the queen is defined as a single dominant vehicle equipped with a long range communications system; and a plurality of vehicles defining a swarm, where the queen and the swarm vehicles form a local communications network under control of the queen, and a remotely operated workstation for issuing commands to the queen which are relayed to the swarm and receiving data from the swarm via the queen. The system includes marine, land, and aerial unmanned vehicles.

In a preferred system, the invention includes a method of deploying unmanned vehicles comprising the acts of (1) deploying a plurality of unmanned vehicles in grid formation; (2) designating a single vehicle as the dominant queen wherein the queen is equipped with a long range communications system; (3) designating the remaining vehicles as the submissive swarm wherein the swarm vehicles are equipped with short range communications systems; (4) designating one or more of the swarm vehicles as a backup queen wherein the backup queen or queens are equipped with long range communications systems; (5) transmitting commands to the queen from a remote control workstation; and (6) relaying commands from the queen to the swarm. Data collected by the swarm is generally (7) transmitted from the swarm vehicle(s) to the queen and (8) relayed from the queen to the remote control workstation.

Figure 22A:
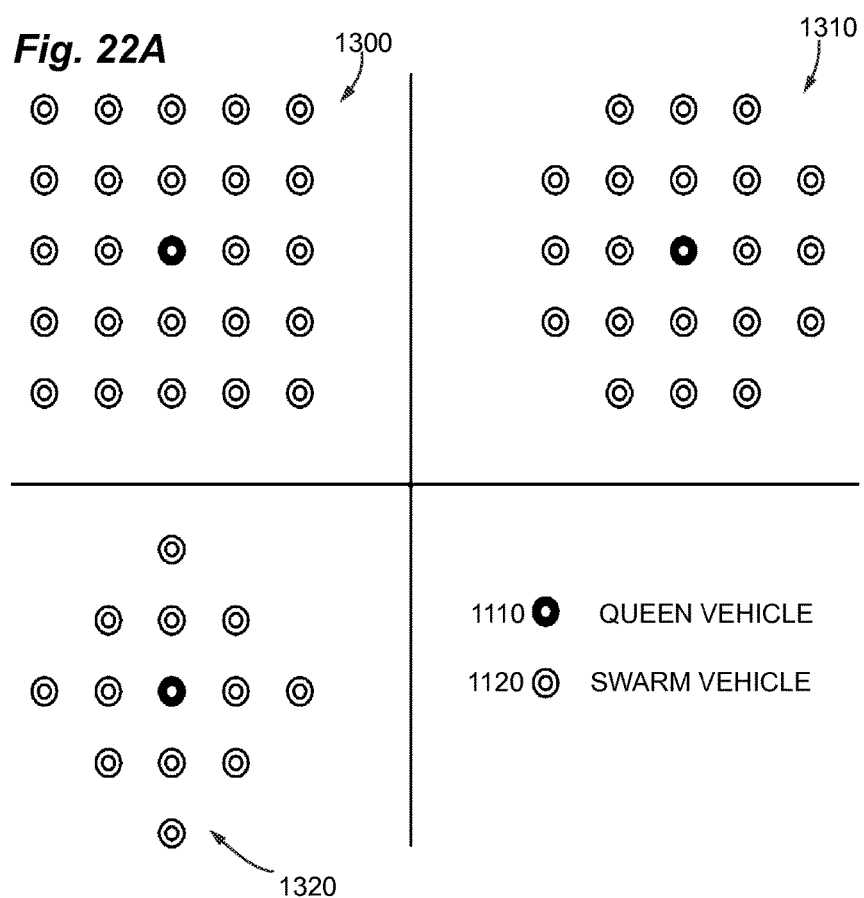

The vehicles will generally be deployed in formation. FIGS. 22A and 22B are schematic representations of alternate array configurations of swarm and queen vehicles. Also shown is a legend. In FIG. 22A, the queen 1110 is centered in an array of swarm vehicles 1120 forming a swarm. A grid formation is a formation in which each vehicle is positioned on a grid corner wherein the grid is made up of equal squares. The grid formations may be any size and shape so long as the vehicles are positioned on the grid corners with no unfilled inner grid corners, as shown in a standard box grid 1300, a corner-less grid 1310, and a diamond grid 1320. The formations may be made up of any quantity of unmanned vehicles. In FIG. 22B the queen is depicted at a peripheral location relative the swarm. In formations such as those depicted (1400, 1410, and 1420) where no vehicle is truly central, the queen 1110 may be positioned off-center relative to the array of swarm vehicles 1120. The formations may be made up of any quantity of unmanned vehicles, wherein unmanned vehicles include marine, land, or aerial vehicles, as in a peer-to-peer or mesh network including other communications assets.

Figure 22C:
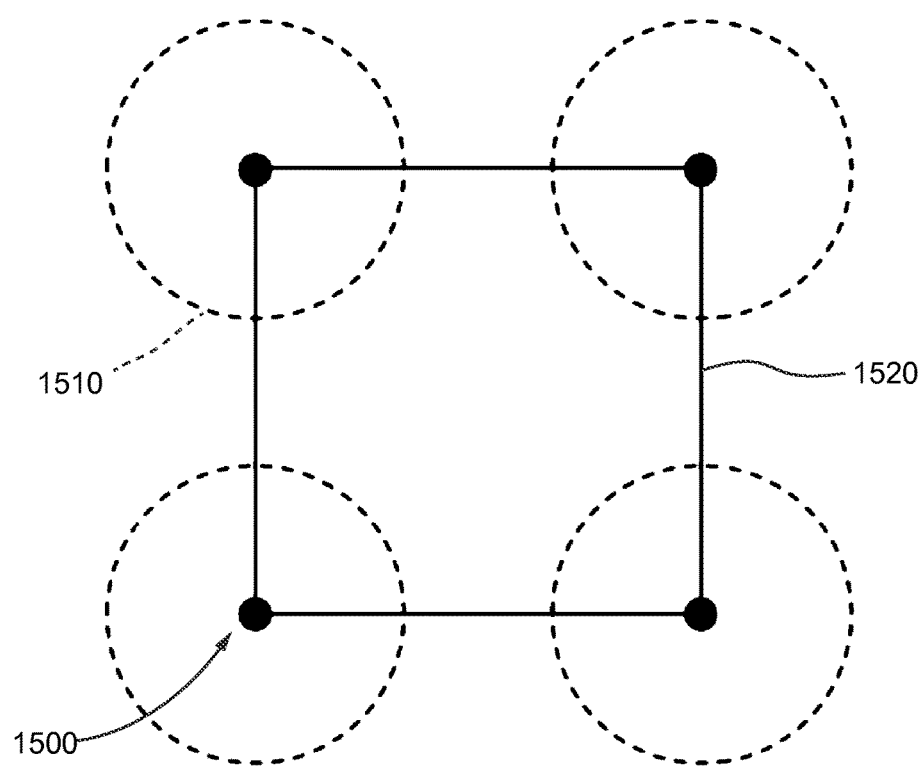
FIG. 22C depicts positional tolerance of vehicles in a grid formation.

FIG. 22C depicts position tolerance of vehicles 1500 in a grid formation. When vehicles are deployed in grid formation, a position tolerance 1510 may be used to ensure that none of the vehicles 1500 collide. The position tolerance 1510 should be within a radius of less than one half the length of a side of a grid square 1520. Any grid size may be used. Typically the swarm array command sequence includes commands to establish and maintain a position tolerance relative to a spatial grid established by the queen or by the remote control workstation. Position tolerance allows for environmental factors such as wind, current, and terrain. Grid size is a user preference that is dependent on network strength and operation, among other things. Avionics functions for maintaining positional tolerance relative to a grid position also may be an on-board function of the swarm vehicles.

Figure 22E:
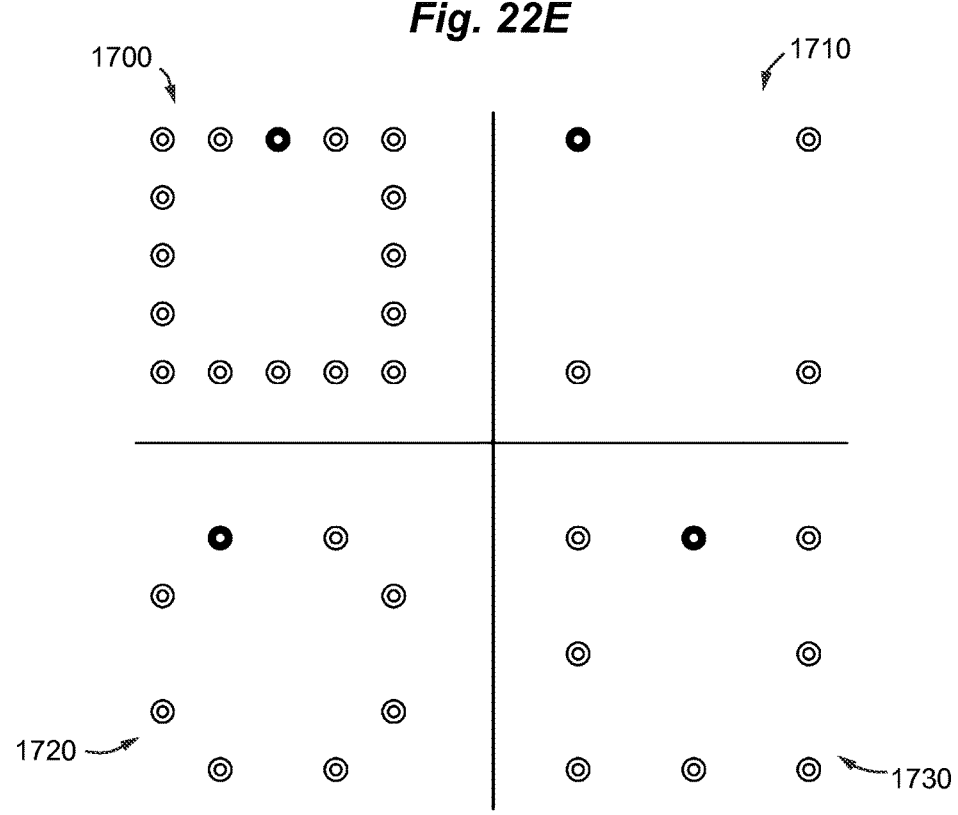
Figure 22F:
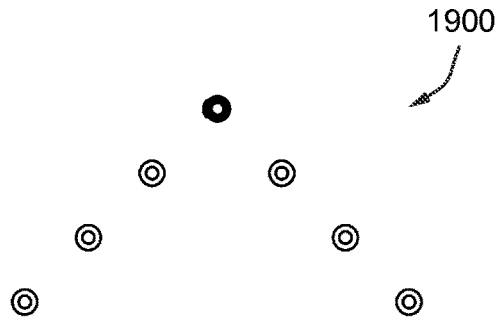
Figure 22G:

FIGS. 22D, 22E, 22F, and 22G depict alternate planar array formations for deploying swarm vehicles 1120 under control of a queen vehicle 1110. FIG. 22D depicts array formations (1600, 1610. 1620, 1630) having a central queen. FIG. 22E depicts array formations (1700, 1710, 1720, 1730) having an off-center queen. FIG. 22F depicts a "V" formation 1900. In the "V" formation 1900, the queen 1110 is the point vehicle and the swarm vehicles 1120 trail the queen. FIG. 22G depicts line formation 1901. These formations may be made up of any quantity of unmanned vehicles, where unmanned vehicles include marine, land, or aerial vehicles, and may be supplemented by other communications assets. Generally data from the swarm is fed to a remote server and is processed for usable information that can then be relayed to human observers, but data also may be used locally, as for maintaining positional tolerances, reacting to malfunction of the queen, and reacting to attack or weather conditions for example. The swarm may be capable of some level of autonomous flight under internal control of on-board avionics (such as autopilot and stabilization routines), but is generally controlled by remote command systems and computing machines having a human operator for directing or supervising swarm operations.

Data is collected from sensors supplied with the unmanned vehicles and supplemented with data from other assets having a communications interface with the swarm. The swarm vehicle sensors are capable of relaying data in real-time, generally through the queen to a remote control workstation and/or local human operators, or of storing data in on-board memory for processing or for later transmission. Sensor data may include data acquisition instrumentation, including sensors for detecting and interpreting positional clock data from global positioning satellites (GPS), altitude data from altimeters, range-finding data for targeting and wayfinding, and also data from specialized sensors enabled for collecting images, sounds and sound patterns, wind speed and direction, humidity and precipitation, temperature, weather-related data generally, motion sensors for detecting movement of troops, refugees, vehicles, vessels and so forth, infrared sensors, radiation sensors, radar signal detectors, sensors for detecting and triangulating signal transmissions by use of a swarm of vehicles, chemical sensors such as for urea and uric acid, or Sarin and VX nerve gas, or biological agents, and sonographic sensors that include acoustic pulse generation and pulse echo detection instrumentation and passive listening for operation when immersed in a body of water. Also for inclusion are other portable sensors as are known in the art.

Figure 23:
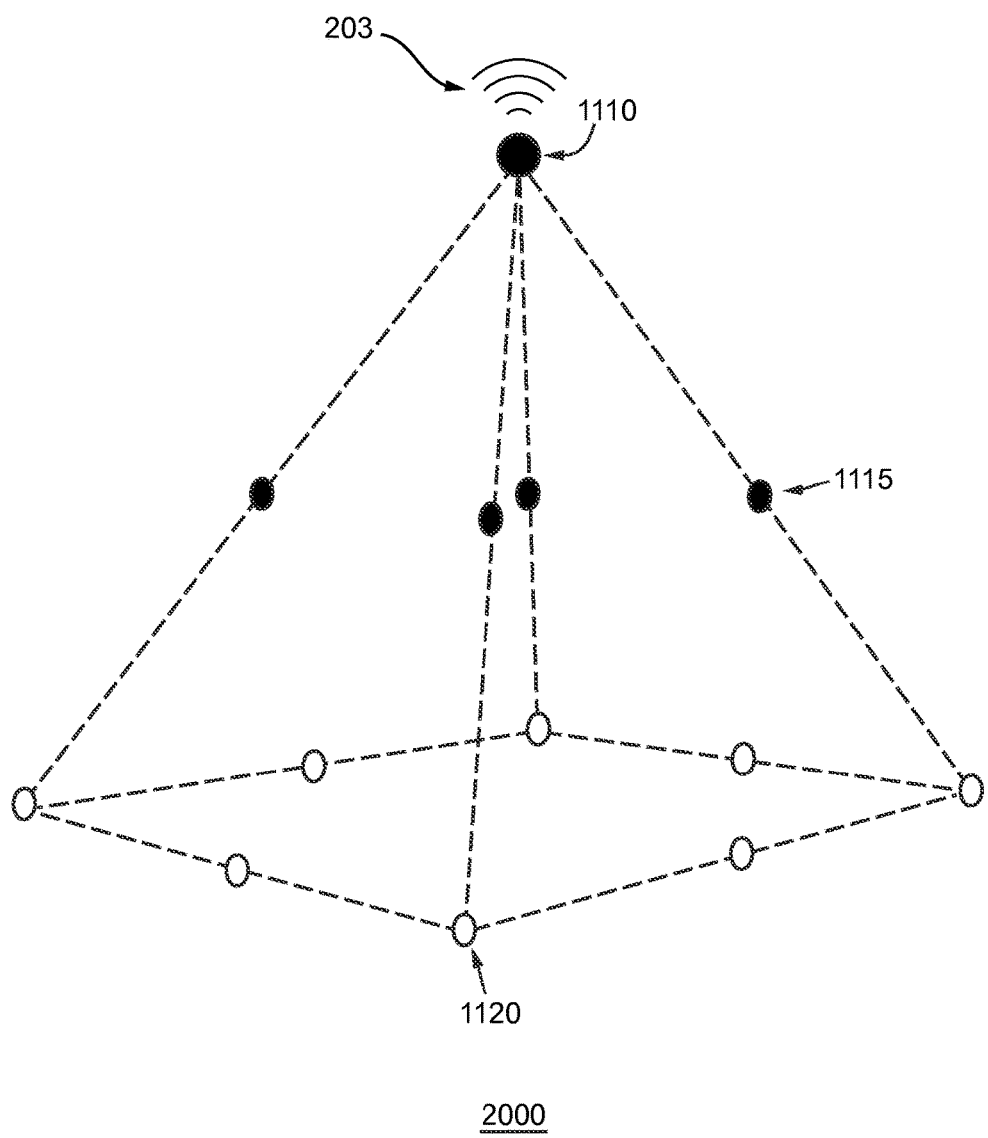
FIG. 23 is a view of a three dimensional array having an airborne queen vehicle at an apex and swarm vehicles arrayed on a target.

FIG. 23 is a view of a three dimensional array 2000 having a queen vehicle 1110 at an apex and swarm vehicles 1120 at lower altitude. Backup queen vehicles 1115 are deployed at an intermediate altitude. After assuming position, the vehicles may be brought to ground in a high density terrestrial grid, but the aerial approach to the target area is taken with caution to protect the more expensive queen vehicles. In urban areas and war zones, the lower altitude vehicles may be subject to small arms fire. Having the queen at higher altitude also may improve the quality of telemetry and command communications to the remote RCW site or sites, and can compensate for physical barriers to cell or radio waves such as when deploying between multi-story buildings, or in mountainous terrain, or when subject to ground interference.

In another embodiment, the arrays of the invention may disassemble when attacked or on approach to target, and individual swarm vehicles may follow randomized pathways to then reassemble in an ordered array over a target area. This function may be achieved by autonomous autopilot routines stored on-board with the queen or with individual swarm vehicles, or may be effected under centralized control. Unmanned aerial vehicles operated autonomously to cluster and dissociate in ordered arrays or as temporal patterns of waves are believed to represent an advance in the art, and may have value in target surveillance, search operations where precision sensing is required, and in coordinated attacks with live munitions carried as payload on the vehicle, for example. By coordinating flight operations in the absence of radio emissions using pre-programmed "play-by-play" logic, a new level of hover-enabled stealth approach is achieved.

Figure 24:
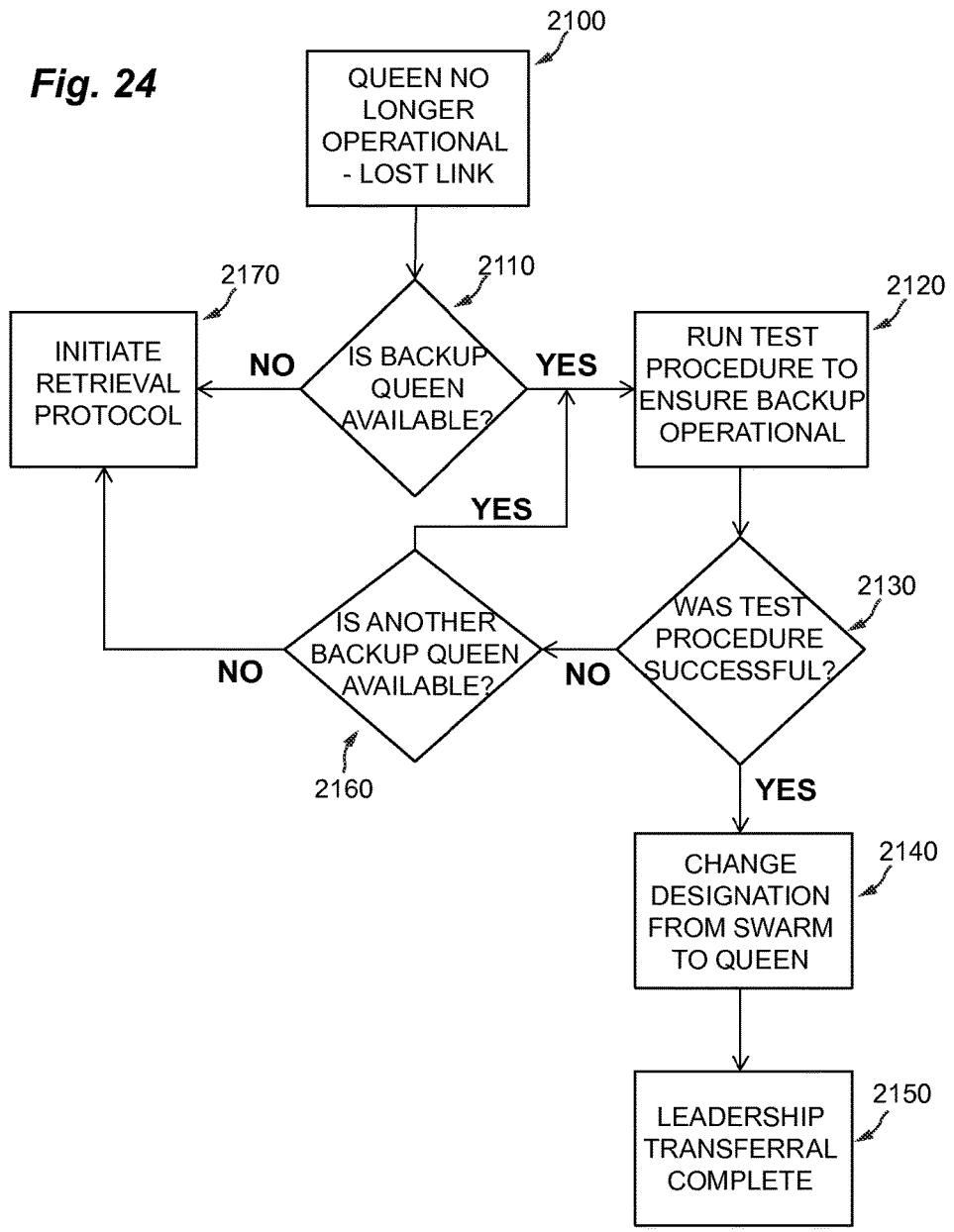
FIG. 24 is a flow chart showing a process for replacing an inactivated queen with a backup queen or queens. Also shown are optional backup queens.

FIG. 24 is a flow chart showing a process for replacing an inactivated queen with a backup queen or queens. Should a queen vehicle become non-operational, or should a lost comm link be sustained 2100, and should a backup queen be available 2110, a test procedure 2120 will be run on the backup queen to determine if it is operational. If the test procedure is successful 2130 (YES), the backup queen's designation will be changed 2140 from swarm to queen and the backup queen will become the dominant queen in the formation 2150. If the test procedure was unsuccessful 2130 (NO), and another backup queen is available 2160, the next backup queen will be tested 2120, and the process will cycle through a reiterative loop until either a functional backup queen is detected, or all available backup queens have been disqualified. If there are not any functional backup queens available, retrieval procedures may be initiated 2170 to retrieve all of the vehicles in the formation. In embodiments wherein multiple backup queens are used in the formation, the queens will each have a priority designation dependent upon their position within the formation, and will replace the queen in order of priority. Backup queens near the center of the formation generally will have higher priority designations than backup queens near the edges of the formation.

Figure 25:
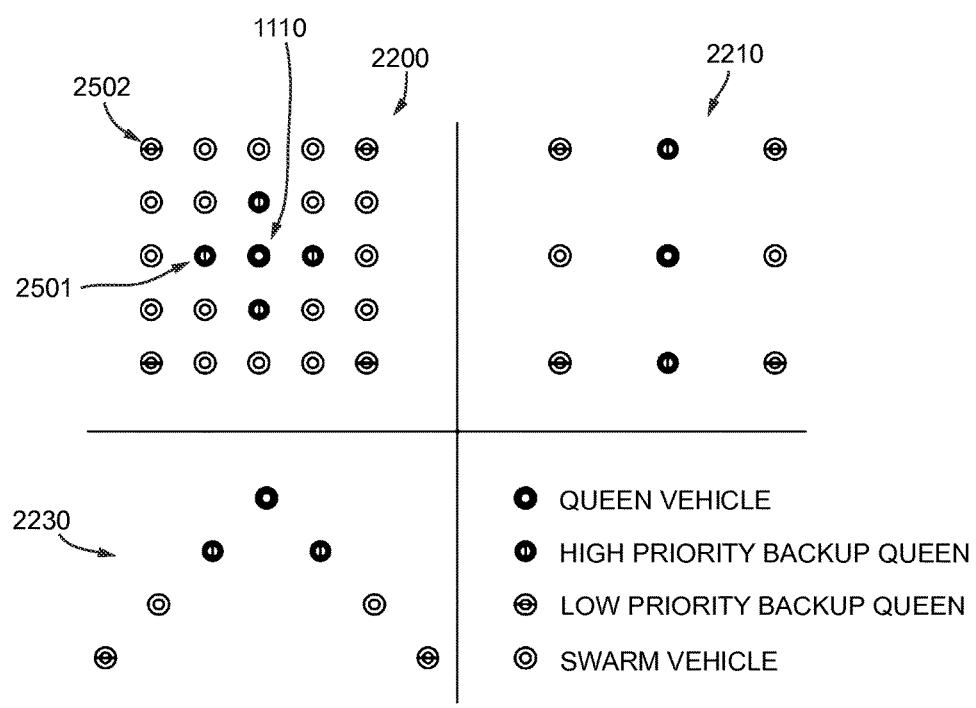
FIG. 25 depicts arrays having high and low priority backup queen positions for selected formations.

FIG. 25 depicts high and low priority backup queen positions for selected formations. The high priority backup queens 2501 are near the center of the formations, in proximity to the queen 1110. The lower priority queens 2502 are near the edges of the formations, farther away from the queen 1110. Illustrations of backup queen prioritization for grid 2200, square 2210, and "V" 2230 formations are provided. Also shown is a legend.

Figure 26:
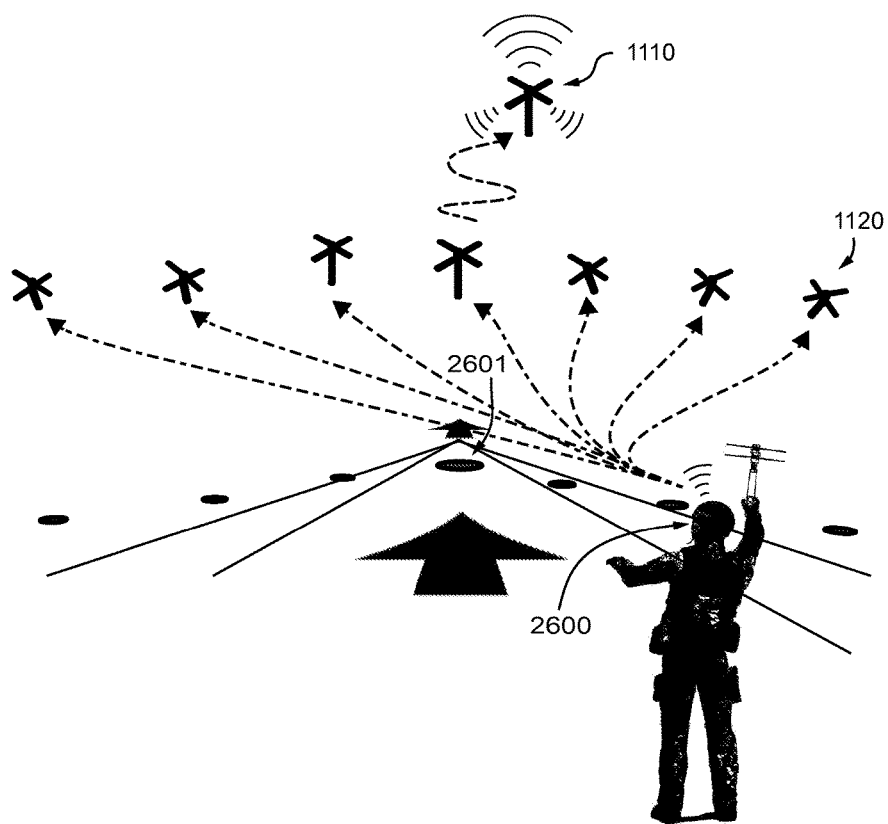
FIG. 26 is a view of a method of deploying a swarm of vehicles in a "V-shaped" array.

FIG. 26 illustrates a typical application for vehicles having controlled ascent capability. At time $t_1$, a soldier or other user with radio control helmet 2600 powers up a first vehicle, such as by pressing a push switch, and throws it into the air. It can hover near the launch area or can move off to establish a forward array point 2601. At time $t_2$, a second vehicle may be launched. Generally, 1 to 7 or more vehicles may be hand launched by one or several persons acting in concert. The vehicles are supplied with rotary wings or other lift mechanisms and are capable of controlled ascent. Steering is achieved with one or more of rotors having variable pitch control, accessory rotors, rotors in combination with a gimballed vehicle neck for pitch attitude directional control, and so forth. The vehicles may include a queen 1110 and one or more swarm vehicles 1120. Optionally, a single vehicle may be launched and results evaluated before committing additional vehicles. These vehicles are generally hand-sized such as described in FIG. 1 and may be carried in a backpack, a bandolier, a belt loop, or a vest. Some such vehicles are pocket sized and include fixed pitch duplex rotors for lift and gimballed necks for steering.

After launch, vehicles are directed to a target area and assume stationary positions at the nodes of an array that are mapped or projected onto the location of interest, such as coordinates along a transportation corridor, or along a fire break. An array need not be geometric in spatial distribution, and may be instead configured to follow the contours of the land, the curves of a road, or the dunes along a shore. In some instances, the designated destinations may be reprogrammed in flight, such as in response to a change in conditions on the battlefield, or when new information about a wildfire, a capsized boat, or a missing person is received.

Swarm vehicles are generally either equipped with a sensor package, may have a payload of explosives, or may have cargo for unloading by personnel at the target site. Sensors transmit data back to a remote control workstation. The data also may be shared with larger networks. The vehicles optionally may be redirected according to shared data, such as by withdrawing from the sound of gunfire. Control may be local, such as through a helmet-worn control system, a backpack, or a vehicle with control workstation, but also may be remote, such as via a cellular network, an internet cloud-based network, or a satellite download from a workstation halfway around the world. For illustration, FIG. 26 shows a soldier wearing a helmet having radio and display functions built in. Voice activated commands may be used to reposition the array during flight. Commands also may be relayed, such as from an artillery command and control center, where the array includes rangefinding sensors for painting targets as it moves forward (bold arrows) at an intermediate altitude.

Figure 27:
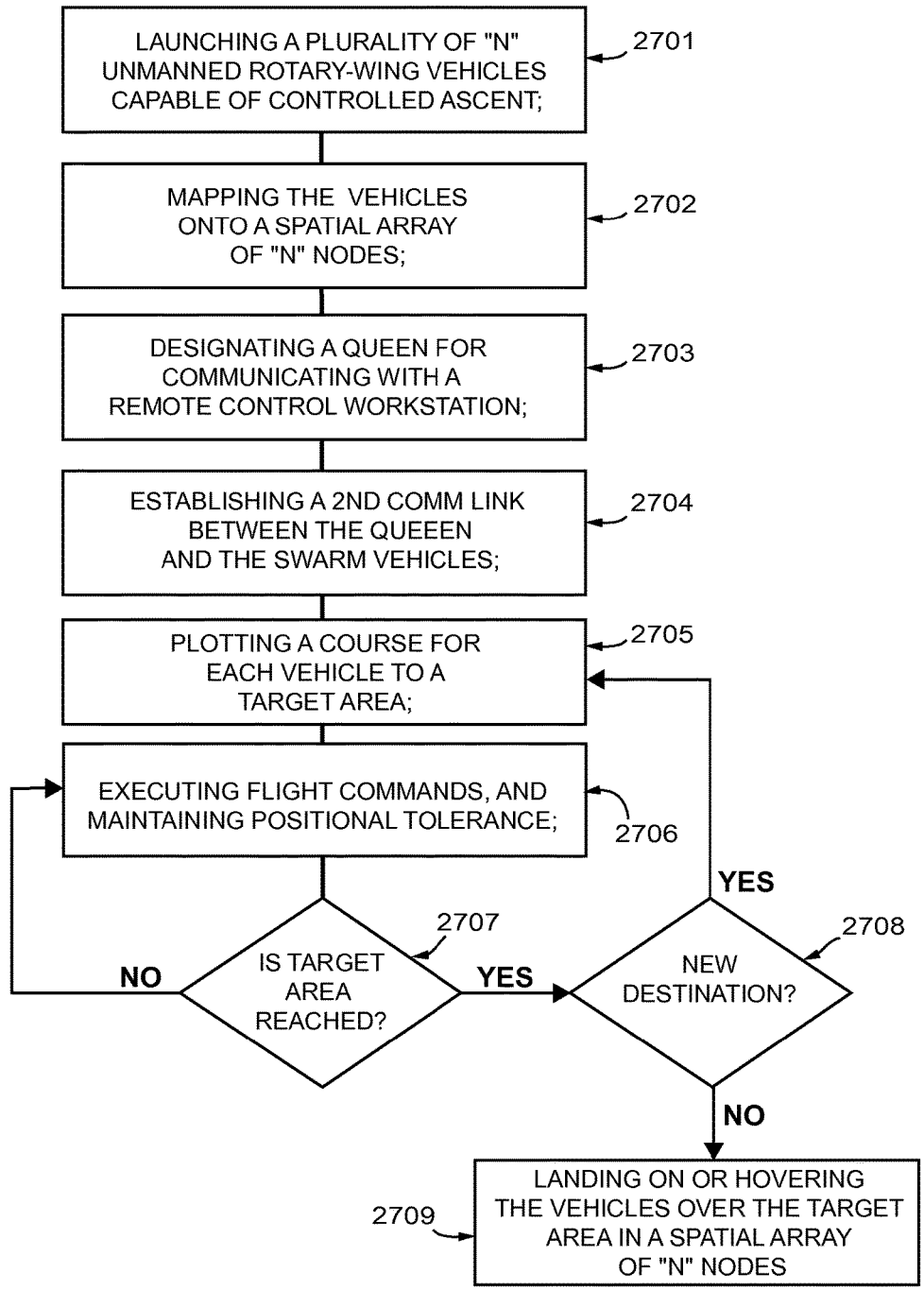
FIG. 27 is a flow chart of a method for deploying vehicles capable of flying in controlled ascent.

The method is described more generally in FIG. 27. This method and variants thereof may be used with vehicles capable of some level of flying in controlled ascent and optionally of hover mode. Before or after launch 2701, the vehicles are programmed or "mapped" 2702 to fly to selected nodes of a spatial array, such that "n" vehicles saturate an array having "n" nodes. Arrays of vehicles having controlled ascent capability may be dynamic or static; i.e., the dynamic array may be formed while the vehicles are in flight, as in a "flying V" having 7 nodes as illustrated in FIG. 26, or may be static arrays formed when the vehicles hover over or descend onto a target area. Because flight time is generally limited, typically a static array of grounded vehicles results.

In a preferred embodiment, a queen is designated 2703 for establishing a communications link, particularly if specialized capability is needed for satellite upload of data and download of commands is needed. The queen also 2704 establishes a comm link with the swarm vehicles, and receives status and sensor data, generally on a separate radio frequency.

Direction of flight 2705, including altitude control, and any course correction may be handled by on-board systems in each vehicle, by the queen, or by networked systems shared between the vehicles such as via a remote control workstation (RCW), but is typically based on GPS positional control in the manner of a feedback loop. The loop may include execution of flight commands 2706 to stabilize the vehicle and react to wind gusts and other course disturbances, and also may include software for maintaining positional tolerance and direction to avoid collisions with other vehicles in the swarm.

If the target is reached 2707, each vehicle is landed or caused to hover at a designated target node of the array mapped on the target site 2709. Alternatively, instead of landing, a new destination may be added 2708. In a separate step, holes in the array or supplemental array vehicles for expanding the array, may be added by flying additional vehicles to the target. Vehicle status is reported to the RCW, which may be a field operations unit, a helmet worn by an officer, or any of a worldwide network of central operations stations accessible by satellite, for example Array operations may be conducted in flight and hover mode, and may be continued at the designated target site after the vehicles land. Array operations may include sensing and transmission functions under remote monitoring and control. These operations generally include collection of sensor data, but also may include reconnaissance, painting targets, range finding, rescue, delivery of supplies, triggering of payload munitions, or placing a diversion to be used during combat operations, while not limited thereto. Arrays may be designed to self-destruct on command, such as when exploding, or may be operated for hours, days or weeks, as in surveillance of critical roads, bridges, borders, coastlines, and so forth. Both land and sea rescue operations may be supplemented using sensors dispersed as an array of the vehicles of the invention. One such vehicle, having a duplex counter-rotating rotor assembly and a gimballed neck, is depicted in FIG. 1, and is capable of controlled ascent.

Figure 28:
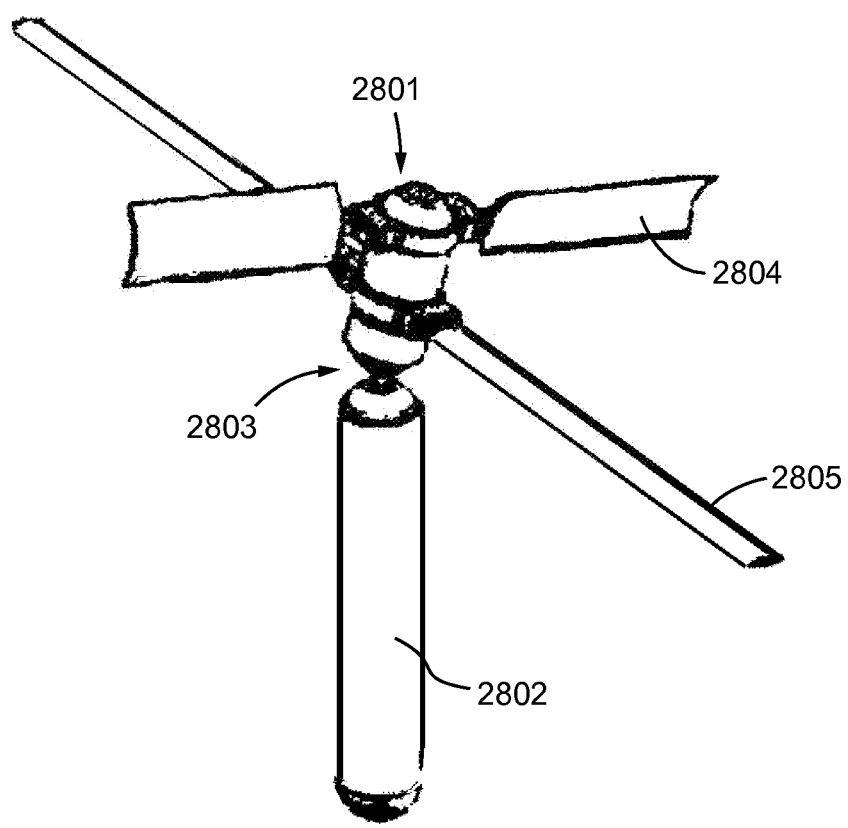
FIG. 28 is a view of a hand-sized vehicle having a vane and rotor combination for flying in controlled descent.

FIG. 28 is a view of a hand-sized vehicle 2800 having a vane and rotor wing combination for controlled flight during descent. The size of these vehicles makes miniaturization of complex steering components difficult and undesirable. These miniature vehicles include a rotor head 2801, a lower body 2802, and a gimballed coupling 2803. Preferably, both the vane 2804 and rotor 2805 are motorized, although in some simple systems, the vane can be a passive element limited to use so as to reduce spin, or the rotor can be a passive element limited to use so as to slow descent or achieve temporary ascension during repositioning maneuvers. The rotors and vanes may be hinged and may fold against the body fuselage during launch and unfolded during flight.

Figure 31:
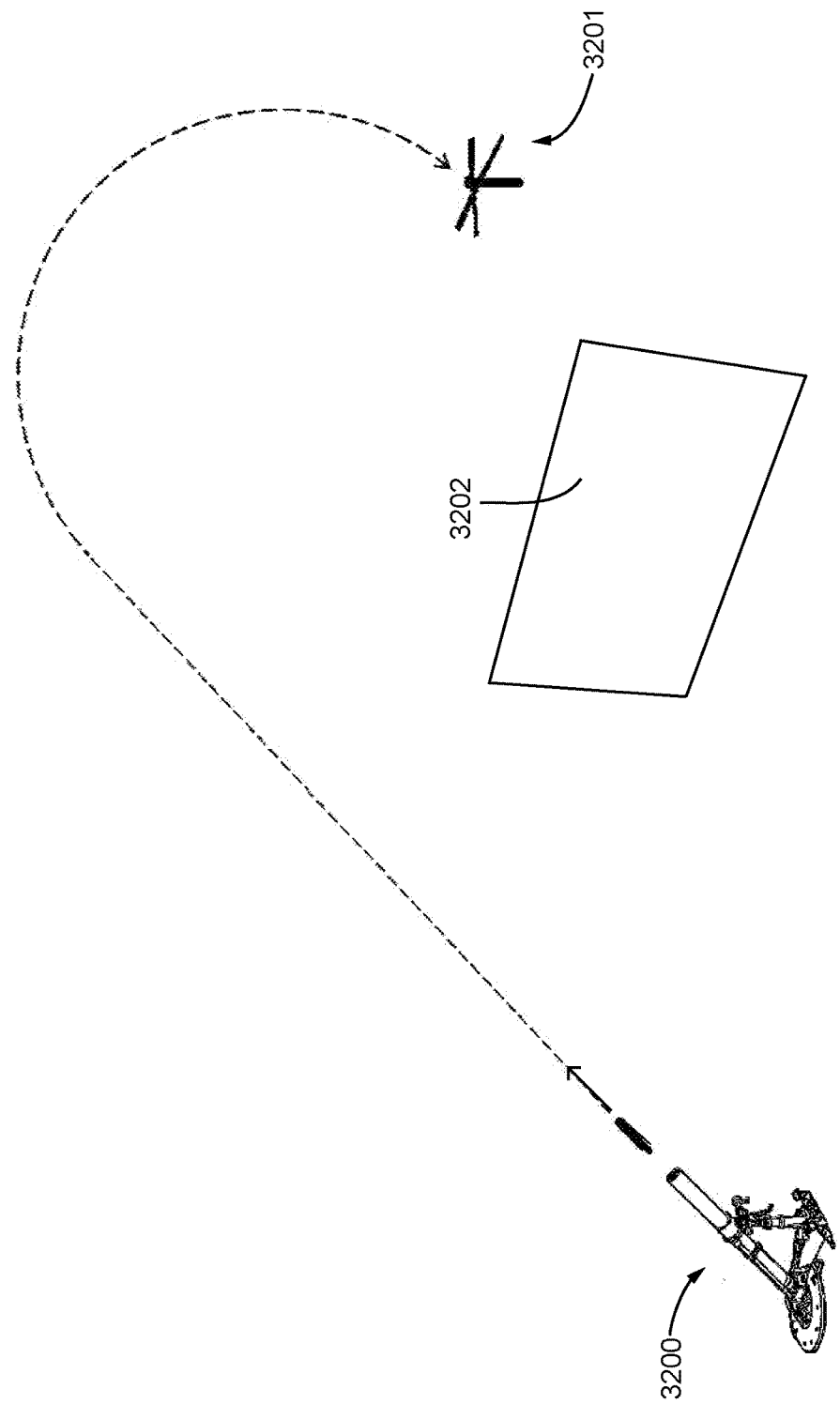
FIG. 31 illustrates use of a controlled descent vehicle of the invention to deliver a smart munition to a target behind or around obstacles.

In the preferred embodiment, the rotor is motorized and will spin so as to permit limited ascent for repositioning. The vanes also may be motorized and can be used to control position during descent. Surprisingly, these features function in combination to permit unexpected non-ballistic flight behavior, such as shown in FIG. 31, which illustrates the controlled flight capabilities of a vehicle of FIG. 28 to deliver sensors, cameras, or munitions, for example, behind or around obstacles 3202. As shown in this rendering, a mortar 3200 is used to launch a small rotary-wing vehicle 3201, which during descent assumes active flight control and may be flown in a "fish hooked" trajectory to land (or explode) behind the obstacle. Means for hardening active aerial vehicles for use in tube launch are known in the art (see for example U.S. Pat. No. 6,347,764 to Brandon).

When vehicles having these features are launched in multiples, they may be formed into the arrays described in FIGS. 21-23 and in FIG. 25 during descent, and may correct their coordinates to achieve the positional tolerances described in FIG. 22C. Optionally, this may be achieved with either variable pitch control of the rotors or by controlling flight using an active gimbal mechanism as described in FIG. 4 to achieve pitch attitude control with fixed pitch rotors. In this way, clusters of vehicles may be dropped in precision arrays onto a target, an advance in the art. In some instances, the vehicles are intended to be dropped onto a terrain or a body of water in a defined grid or other array, but flying arrays also may be formed, and used in surveillance operations to triangulate on targets or perform other sensor operations while airborne.

In some instances "augmented autorotation" flying may be used. Conserving power is achieved by limiting initial descent to passive rotor conditions and then actuating the rotor or rotors for final targeting. Power may be increased during final descent to allow for final course corrections. The rotors will autorotate when not powered and increase drag on the vehicle, allowing vanes or other aerodynamic surfaces to perform initial targeting during controlled descent. If desired, controlled ascent power may then be applied to correct for wind gusts, wind shear, or other conditions that require significant repositioning near the landing area. In some instances it may be possible to arrest descent when approaching the target landing area. Sensor altimetry is possible using relatively inexpensive camera rangefinders or using radar altimeters, for example. If course correction is needed, the rotor or rotors may be spooled up to reverse descent and gain altitude for a course correction. If variable pitch rotors or accessory active aerodynamic surfaces are used, added active steering is possible. In another instance, the vehicle may be placed in free fall for the final few feet. Thus controlled ascent and controlled descent are two ends of a spectrum, and hybrid flying control may be achieved by combining aspects of each depending on the mission.

Figure 29:
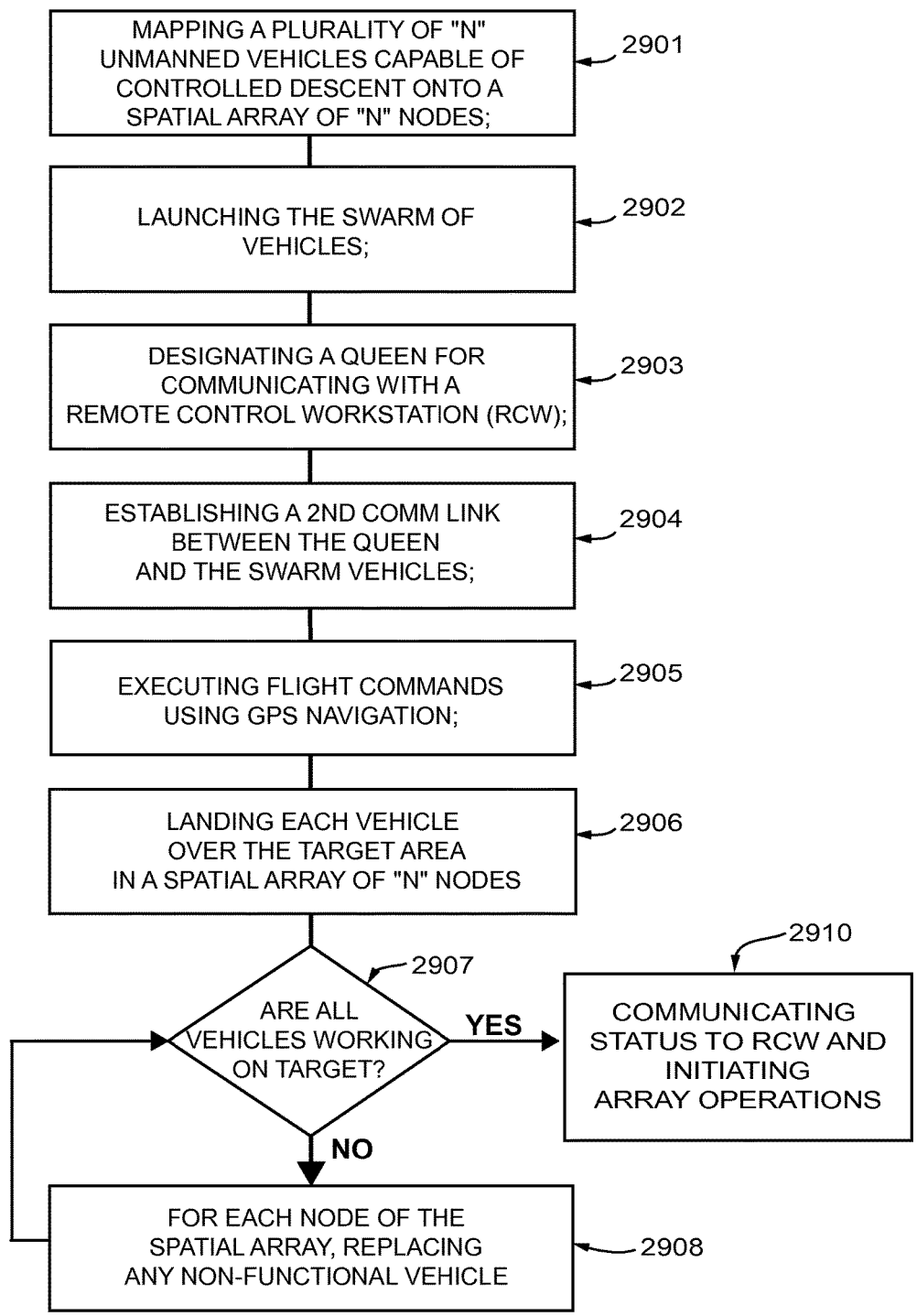
FIG. 29 is a flow chart of a method for deploying vehicles capable of being formed into targeted arrays by controlled descent.

FIG. 29 is a flow chart of a method for deploying vehicles capable of being formed into arrays covering a target area where the vehicles are positioned by controlled descent. Vehicles are fitted with control surfaces such as vanes, rotors and winglets, and rotary-wing vehicles of the invention may have a gimballed neck for steering during descent. Steps include programming a plurality of vehicles 2901, "n" in number (where n depends on the size and density of the array), to descend onto a spatial array of "n" nodes on the ground or on a body of water. Programming involves supplying GPS destination coordinates to the vehicle in the manner of a waypoint. The vehicles are responsible for executing independent flight operations needed to land at the designated array node coordinates. The vehicles are launched 2902 so as to be dispersed at an altitude over the target zone sufficient to execute controlled descent maneuvers 2905 that bring them to their designated array nodes. An altitude of several thousand feet is generally sufficient, but lower or higher altitudes may be needed depending on wind conditions, presence of hostile fire, size of the array, and so forth.

A queen is designated 2903 for establishing a communications link, particularly if specialized capability needed for satellite upload of data and download of commands is needed. The queen 2904 establishes a comm link with the swarm vehicles, and receives status and sensor data, generally on a separate radio frequency.

Each vehicle is landed at a designated node of the array 2906 and its operational status is checked 2907. In a separate step 2908, holes in the array or supplemental array vehicles for expanding the array, may be added. Vehicle status is reported to a remote control workstation (RCW), which may be a field operations unit, a helmet of an officer, or any of a worldwide network of central operations stations accessible by satellite, for example.

Array operations 2910 may be initiated during the descent or when the vehicles are at their designated nodes. Array operations may include sensing and transmission functions under remote monitoring and control. These operations generally include collection of sensor data, but also may include reconnaissance, painting targets, range finding, rescue, delivery of supplies, triggering of payload munitions, or placing a diversion to be used during combat operations, while not limited thereto. Arrays may be designed to self-destruct on command, such as when exploding, or may be operated for hours, days or weeks, as in surveillance of critical roads, bridges, borders, coastlines, and so forth. Both land and sea rescue operations may be supplemented using sensors dispersed as an array of the vehicles of the invention.

Figure 30:
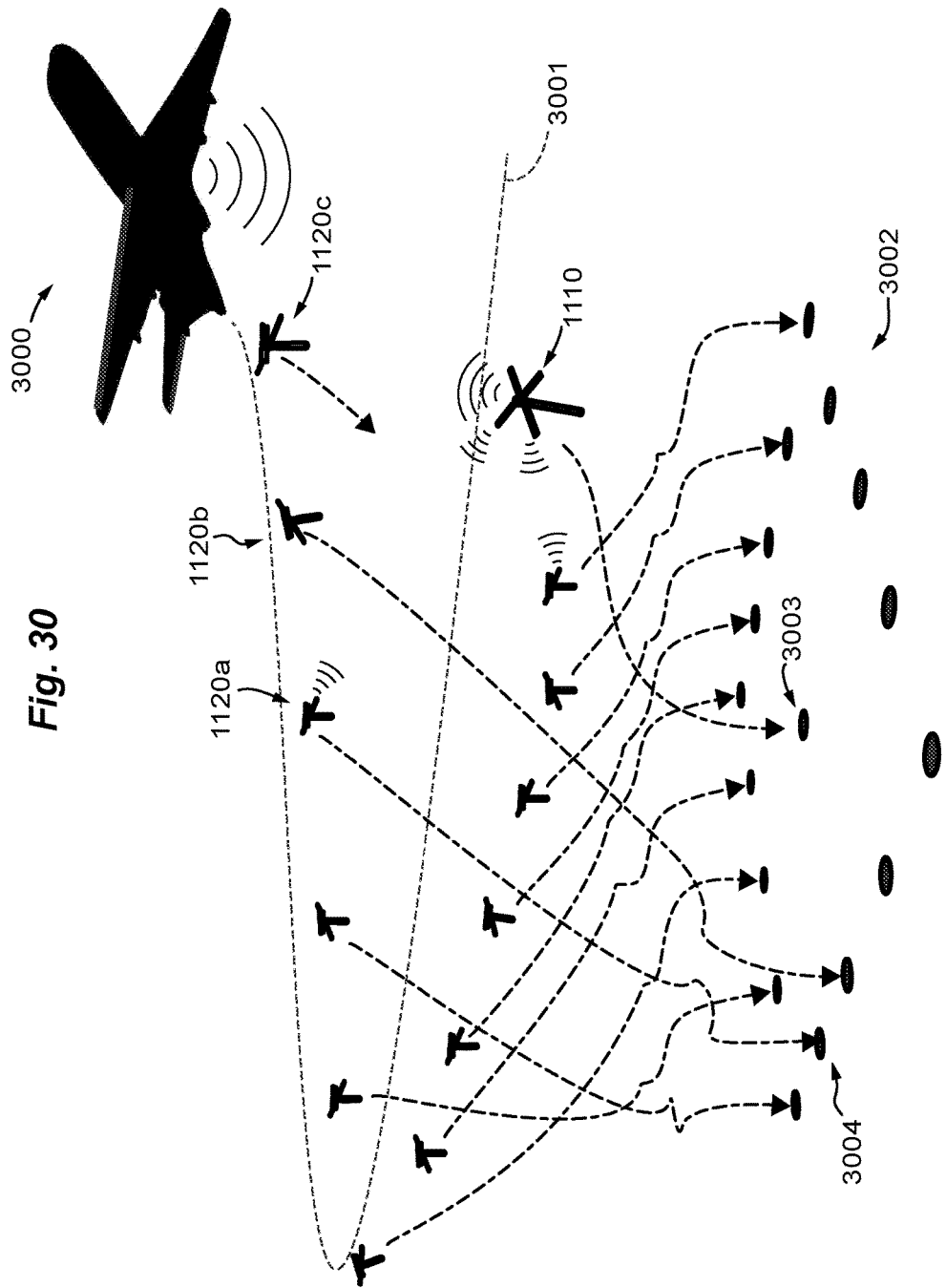
FIG. 30 illustrates use of an airplane to deliver an array of controlled descent onto a target area.

FIG. 30 illustrates use of an airplane 3000 to deliver a swarm of vehicles of the invention onto a target area. The airplane follows course 3001, dropping the vehicles from a cargo bay, bomb bay, open port, window, or delivery chute as it passes over a target area 3002 with center 3003. The details of the array configuration desired vary with mission requirements and are not limited to the grid formation shown here. The size and density of the array will be dependent on the application.

Prior to launch, each vehicle receives a command instruction defining the coordinates of an array node it is to occupy. Each vehicle is equipped with a GPS-based navigation system and aerodynamic surfaces such as vanes, rotors and winglets to control descent, and rotary-wing vehicles also may be provided with a gimballed neck to effect steering. As indicated by dashed lines, the vehicles make course corrections as they approach the landing zone. Swarm vehicle 1120a drops to array node 3004, vehicle 1120b to a next node, vehicle 1120c to the following node, and so forth. Generally, one vehicle is designated as a queen 1110 and is responsible for communicating commands from a remote control workstation and for relaying data and status from vehicles in the array to the remote station.

Array operations can begin while the vehicles are still airborne or can be started when the array status has been verified on the ground. Any vehicle that fails to reach its designated landing node may be replaced in a subsequent air drop. Each swarm vehicle of the array has telemetry capability for sending data to a local receiving station or to a queen responsible for relaying telemetry over longer distances. As shown here, queen vehicle 1110 lands at the center 3003 of the array, but the details of the array formation require only that the "comm link" be operational for the lifetime of the array, which may be hours, days or weeks depending on the application. If the queen fails, a backup queen may be promoted as described in FIG. 24. In some instances, certain vehicles are equipped to function as backup queens; in other instances, all vehicles are capable of independent communication with a remote workstation.

The queen vehicle 1110 illustrated in FIG. 30 has advanced capability to establish a remote communications link and to receive and relay data from the swarm vehicles of the array. The queen vehicle may be capable of hovering during the initial deployment and then landing at the array center 3003.

Following landing, the vehicles may perform a function check and report status of the array to a remote control workstation via a comm link established by the queen. Operations of the array may then be triggered by a command issued remotely or may be internally controlled to run according to a pre-programmed sequence. Vehicles may be equipped for landing on land or on sea.

FIG. 31 illustrates use of a controlled descent vehicle of the invention to deliver a "smart grenade" to a target behind or under an obstacle. In this representation, a mortar 3200 or other tube-launch system is used to launch an unmanned projectile 3201 having a rotary wing and vanes that deploy near the top of the ballistic trajectory. The descent is then non-ballistic and targets a location selected by an operator. In this instance, vanes in combination with a fixed pitch rotor are responsible for the backward "hook" in the flight path, which takes the vehicle behind and close to an obstacle 3202. Payload may include an explosive and/or sensors.

Figure 32A:
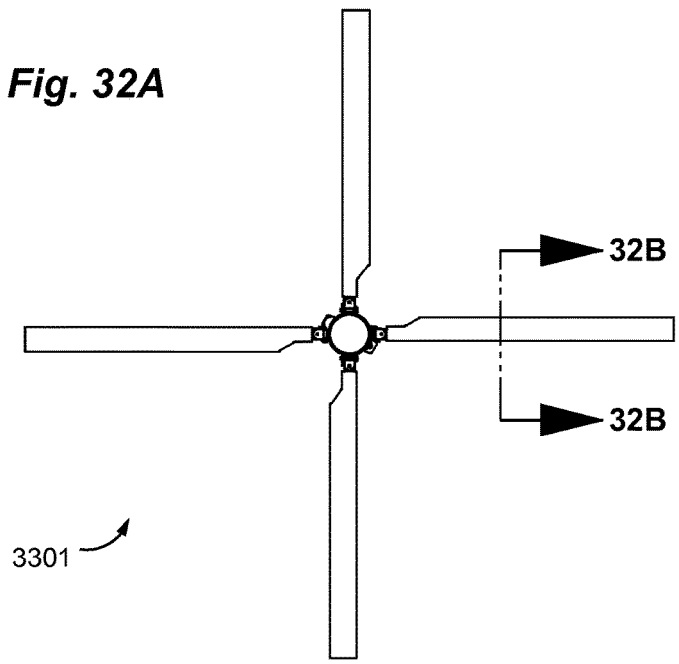
FIGS. 32A and 32B compare a duplex narrow rotor blade to a tri-wing broader rotor blade shown in FIGS. 33A and 33B.
Figure 32B:
Figure 33A:
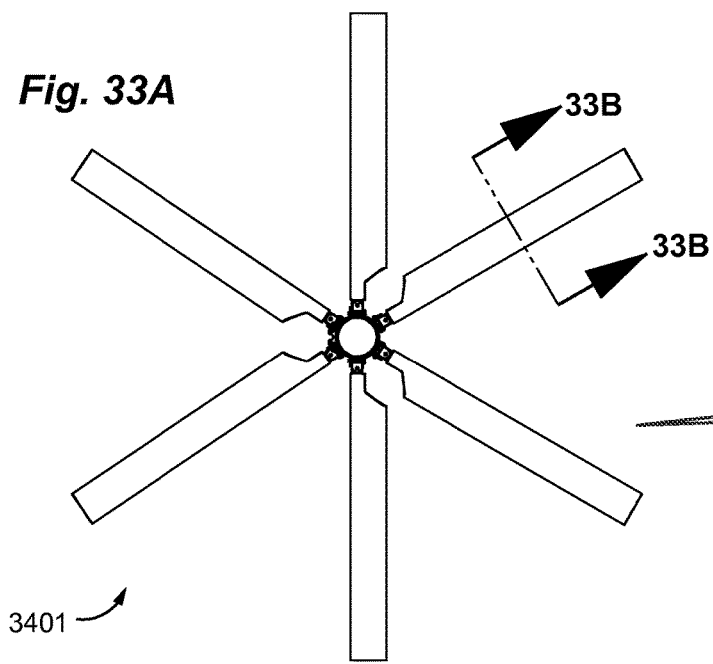
Figure 33B:

FIGS. 32A and 32B compare a duplex narrow rotor blade to a tri-wing broader rotor blade shown in FIGS. 33A and 33B. FIG. 32A compares a narrow rotor blade assembly 3301 to a broader rotor blade shown in the following figure. By operating at a lower rotational velocity, the broader blade assembly 3401 shown in FIG. 33A achieves a "stealth mode" by quieting the rotor blades and motor noise. The broader blade airfoil shown in section in FIG. 33B allows a lower rotational speed as compared to the sectional airfoil view of FIG. 32A while providing lift for controlled descent or in some cases hover or controlled flight on a lateral path. By comparison, the rotor shown in section in FIG. 32B is narrower and configured for higher rotational speeds as needed.

Stealth mode is advantageous for operations where it is desirable not to reveal the presence of the unmanned aerial vehicles by the sound of their rotary wings and motor. For some Special Forces operations, a "whisper wing" may be installed onto the vehicles before a controlled descent onto a target. These quiet airfoils are typically formed to have a larger surface area and operate at slower rotational speeds. The airfoil also may be shaped to generate more lift, and while requiring more power to operate, will have a quieter operating envelope.

Broader rotary-wing elements in tri-blade rotor assemblies are stacked in counter-rotating pairs to achieve stable yaw with hover capability but may be configured with single rotor mechanisms when used with vanes as shown in FIG. 28, where the vanes control spin on the long axis. In a preferred embodiment, a fuselage for carrying a payload is pendant from the rotor mechanism and whisper wing assembly by a gimballed neck and is inexpensive to manufacture and scaleable over a range of lift capacities and body aspect ratio for a variety of applications and payloads. Smaller vehicles may be disposable and may be configured for controlled descent or for short flight times over target. Larger vehicles are generally recoverable and have capacities sufficient for precision delivery in logistical support of troops on the ground, for example.

Figure 34A:
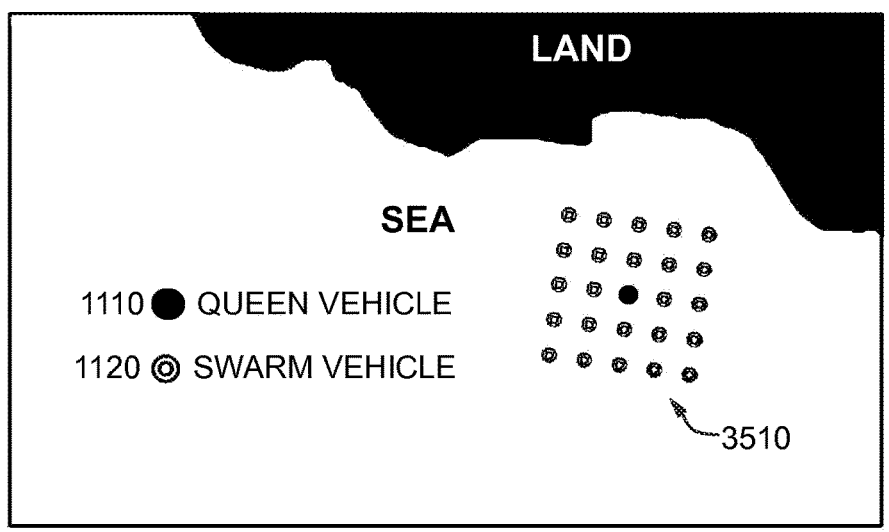
FIG. 34A is a rendering of a grid or "box" formation deployed on, above, or moving over water off a coastline.

FIG. 34A is a rendering of a grid formation deployed on, above, or moving over water off a coastline. In the depicted embodiment a five by five grid formation 3510 is used. The vehicles in the depicted embodiment may be marine vehicles on the surface of the water or aerial vehicles hovering or flying over the water. Generally at least one vehicle of the swarm is a queen 1110. Unmanned vehicles flying in formation may be deposited on land or sea for surveillance or to scan for survivors of a distressed or sunken ship, for example. The vehicles may have auxiliary power sources such as solar cells and rechargeable batteries for extended operation once immobilized. Optionally, the vehicle may be recovered by their operators at a later time or may be launched on-site and flown to a recovery area as described in FIG. 35 for a specialized rotary-wing unit of the invention.

Figure 34B:
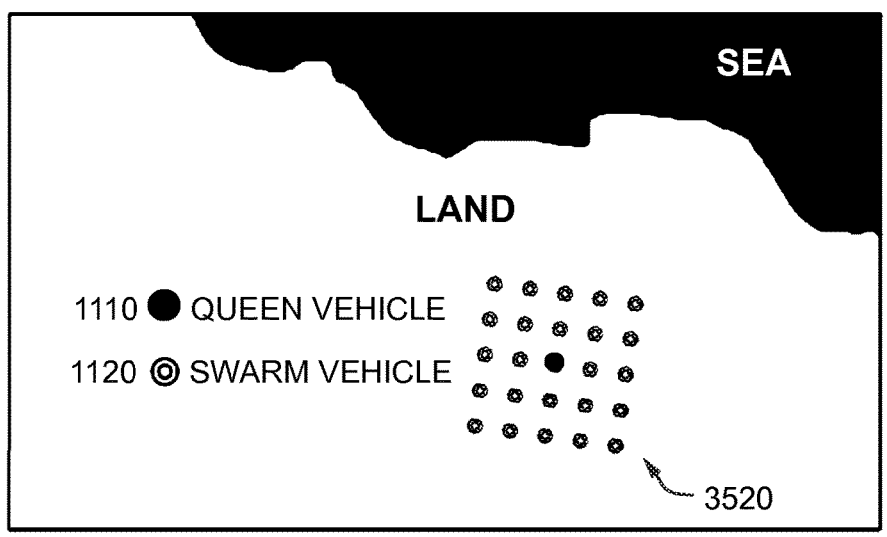
FIG. 34B is a rendering of a grid formation deployed on, above, or moving over land.

FIG. 34B is a rendering of a grid formation deployed on, above, or moving over land. In the depicted embodiment a five by five grid formation 3520 is used. The vehicles in the depicted embodiment may be either land vehicles on the surface or aerial vehicles hovering or flying over the land. Vehicles of this type may be used for example to map land mine fields. Vehicles that have landed on the ground also may pick up samples and be flown to a "safe" location for unloading and analysis in order to identify chemical or biological agents in an area, for example, without the risk of exposing humans.

FIG. 35 shows a method for effecting a sea-air launch of an unmanned aerial rotary-wing vehicle 3600. In this rendering, a rotary-wing vehicle is shown floating in a body of water (designated SEA SURFACE) such that the buoyant mass of the lower body 3601 is sufficient to maintain the rotor head 3602 well above the water. The center of buoyant displacement is sufficiently above a low center of inertial mass so that the vehicle floats in a generally stable upright position, an advance in the art that is achieved with light-weight rotor assemblies 3603, light-weight fuselage construction, and by locating dense materials such as a Lithium ion or LiPo battery assembly 3604 near the base of the fuselage and running a wire harness to the light-weight high-speed motors mounted on the rotor head. Fuel cells or supercapacitors may be used in place of or to supplement a battery if needed, such as for a power burst during a sea launch. Shown here is a waterline 3605 intermediate on the fuselage body.

To launch, the vehicle is quickly brought up to full rotational velocity of the rotor head and lift is applied to pull the submerged body from the water. Once free, the vehicle continues to elevate until the altitude is sufficient to begin horizontal flight maneuvers. The body is then kinked to introduce a lateral thrust component and the vehicle is repositioned or recovered.

In rough seas, the vehicle can include sensing intelligence to detect wave periodicity, and can actuate the top rotor 3606 independently of the lower rotor assembly 3607. Fins 3608 in the water prevent spinning of the fuselage during initial liftoff. When clear of a wave crest, both rotor assemblies are then actuated in counter-rotational thrust to stabilize any yaw precession and the vehicle continues to lift until cruising altitude is achieved. Directional motion is not necessarily dependent on the presence of a gimballed neck 3609, but also may be achieved using variable pitch-controlled rotors, however, the gimballed neck is less dependent on precision parts and lubrication, and can be sealed with a flexible pleated boot 3610 to prevent water intrusion as shown.

The length, cross-sectional area, and aspect ratio of the fuselage of this vehicle determines displacement, which must be sufficient to elevate the rotor head above the waterline. The rotor assembly is generally light-weight to maximize vertical buoyancy, as in a spar buoy. The avionics and battery components having the highest weight per unit area are placed at the bottom of the lower body and act as ballast to prevent the blades from hitting the water.

When configured as a sonar buoy, the bottom surface of the fuselage is fitted with a sonar transceiver 3611 and instrument package 3612. In active mode, pings are reflected off of acoustically diffractive surfaces in acoustic proximity to the sonar buoy 3600 and are picked up by the transceiver and processed for transmission by a "comm module" (with relay antenna in the rotor head) for further signal processing at a remote workstation. Optionally the sonar system is also supplied with Doppler processing mode. In passive mode, digitized ambient noise and signals characteristic of bubbles associated with propellers, or operation of machinery are transmitted over a high bandwidth comm link for analysis at a remote workstation.

These vehicles are valuable, for example, when deployed as remote sonar observation stations. The cost of a battery or fuel cell sufficiently sized for extended operation and any on-board echolocation equipment justifies recovery of the vehicle after use. Once airborne, the vehicle homes back to a tender and is captured for re-use. On-board sonar data interpretive software is not necessary. Raw or partially processed echo, Doppler, and ambient noise signals can be transmitted using a high bandwidth comm port to a mothership or aerial command-and-control workstation where signal processing is completed. Advantageously, devices of this kind can be deployed to enhance submarine countermeasures, and then be recovered or repositioned.

EXAMPLES

FIG. 1 is an example of a typical hand-carried model and has body dimensions of about 23.5 inches on the Z-axis and 3.3 inches in diameter, not including the rotary wings. Rotary wing sweep diameter is about 40 inches. This model can be powered up and thrown up into the air to initiate controlled flight. Flight is radio controlled. Waypoints and velocity are pre-programmed or the vehicle may be steered in real time according to images or sensor data beamed back to a remote control workstation. The remote control workstation is carried in a backpack, but also may be worn as a helmet with two-way radio contact, a visor or heads-up display and earpieces, and a directional voice control subsystem, for example. The remote control workstations also may be fitted in a vehicle.

Two brushless 430L motors (Align, Chico Calif.) are used to power the rotors. Flight time in this configuration is about 20 min. Total weight of about 2 lbs empty. Payload is limited in this model, but may be up to about 2 pounds. Battery power density is a limiting factor in time of flight. The currently used LiPo battery produces about 13 mAhr/gm and weighs about 170 gm; in other words the battery is about 20% of the no-payload weight, sufficient to ballast the device in flight when not carrying other payload.

FIG. 36 represents a larger unit. The device is generally scaleable without major modifications and has been predicted to support larger loads when sufficiently powered. In this configuration, more power is useful in achieving a quick launch for water, where rapid acceleration may be required to escape wave action.

The above disclosure is sufficient to enable one of ordinary skill in the art to practice the invention, and provides the best mode of practicing the invention presently contemplated by the inventor. While above is a complete description of the preferred embodiments of the present invention, various alternatives, modifications and equivalents are possible. These embodiments, alternatives, modifications and equivalents may be combined to provide further embodiments of the present invention. Further, all foreign and/or domestic publications, patents, and patent applications cited herein, whether supra or infra, are hereby incorporated by reference in their entirety for all they teach. The inventions, examples, and embodiments described herein are not limited to particularly exemplified materials, methods, and/or structures. Various modifications, alternative constructions, changes and equivalents will readily occur to those skilled in the art and may be employed, as suitable, without departing from the true spirit and scope of the invention. Therefore, the above description and illustrations should not be construed as limiting the scope of the invention, which is defined by the appended claims.

INCORPORATION BY REFERENCE

All of the U.S. Patents, U.S. Patent Application Publications, U.S. Patent Applications, foreign patents, foreign patent applications and non-patent publications referred to in this specification and related filings are incorporated by reference herein in their entirety for all purposes.

SCOPE OF CLAIMS

While the above is a complete description of selected embodiments of the present invention, it is possible to practice the invention using various alternatives, modifications, combinations and equivalents. In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited by the disclosure.

What is claimed is:

1. An improved unmanned vehicular system for airborne deployment, which comprises:
    (a) a vehicle fuselage having a top aspect, a lower aspect, and a center of mass, wherein said vehicle fuselage is aerodynamic in shape, having an elongate and generally tubular vehicle body assembly with a center Z-axis, such that said center of mass is partitioned to a lower half of said Z-axis thereof;
    (b) a dual rotor head having an apical aspect and an inferior aspect, said rotor head comprising an apical rotor assembly and an inferior rotor assembly, wherein said two rotor assemblies are stacked with a common center axis of rotation;
    (c) each rotor assembly having unfoldable fixed-pitch rotary blades or wings configured to generate lift, and comprising each an electrical motor operatively mounted thereto, wherein said each motor is driven from a power source and separately controllable by a motor speed controller, and wherein said two rotor assemblies are configured to rotate as counter rotational rotor assemblies that generate opposing torque; and
    (d) in combination with said dual rotor head and fixed-pitch rotary blade assemblies, a power gimbal having a gimballed neck that couples said inferior aspect of said rotor head to said top aspect of said fuselage, said gimballed neck comprising powered gimbal bias elements actuated by a gimbal controller enabled to articulate the pitch attitude of said rotor head relative to said fuselage under control of an on-board navigational, communication and steering system;
    (e) further characterized in that said steering system comprises said motor speed controller and said gimbal controller under control of a processor operatively connected thereto, wherein said motor speed controller and said gimbal controller are controllable to achieve yaw control, precession control, and coordinated steering control without a cyclical pitch control means on said rotary blade assemblies.

2. The vehicular system of claim 1, wherein said rotary blade assemblies are stacked head-to-head and one electrical signal is sent to power both rotary blade assemblies in opposite directions, and further wherein the voltage of said electrical signal is varied to independently vary the speed of each rotor blade assembly under control of said motor speed controller.

3. The vehicular system of claim 1, wherein said fuselage and said gimballed neck are watertight and comprise a displacement and center of buoyant mass configured to vertically float and stand said rotor head above a waterline during takeoff, repositioning or recovery; said motors are enabled to be separately driven; said apical rotor assembly is configured to be actuated first during takeoff from water according to a sensor that detects wave periodicity; both rotor assemblies are configured to be actuated and counter-rotated during aerial flight; and said fuselage comprises submersible fins configured to prevent spin of the fuselage when said apical rotor assemble is activated without counter-rotation of said inferior rotor assembly during takeoff from water.

4. The vehicular system of claim 1, wherein said gimballed neck comprises nested brackets and said gimbal bias elements comprise actuator rods or stepper motors operatively enabled to articulate the pitch attitude of said head relative to said fuselage under control of an avionics package in said on-board navigational and steering system.

5. The vehicular system of claim 1, wherein said gimballed neck is articulated, said neck comprises nested brackets and said gimbal bias elements comprise a first stepper motor or actuator rod operatively coupled to the pivot axis of a first bracket and a second stepper motor or actuator rod operatively coupled to the pivot axis of a second bracket.

6. The vehicular system of claim 1, wherein said power source is disposed in an inferior aspect of said vehicle body assembly.

7. The vehicular system of claim 1, wherein said fuselage comprises at least one payload receiving chamber or carriage.

8. The vehicular system of claim 6, wherein said fuselage is configured with a payload receiving chamber or carriage enabled to receive a detachable payload module inserted into said fuselage between said rotor head and said power source.

9. The vehicular system of claim 6, wherein said power source comprises a battery, fuel cell, or supercapacitor for driving said each electrical motor and said motor is operatively coupled directly to said rotor assemblies.

10. The vehicular system of claim 1, wherein said navigation and control system comprises digital circuitry for executing flight commands, non-volatile memory having programmable instructions, volatile memory for storing position data, a clock, a sensor for receiving GPS coordinates, and a communications module.

11. The vehicular system of claim 10, further wherein said digital circuitry comprises flight trim firmware for correcting deviations from stable flight-in real time.

12. The vehicular system of claim 1, further comprising a sensor or a sensor package.

13. The vehicular system of claim 12, wherein said sensor package comprises an imaging system, an infrared imaging system, a night-vision system, a sonar system, a smoke sensor, a position sensor, a motion sensor, a radiation sensor, an altimeter, a rangefinding sensor, or a combination thereof.

14. The vehicular system of claim 12, wherein the sensor or sensor package is capable of relaying data in real-time to a remote control workstation or storing data in on-board volatile memory.

15. The vehicular system of claim 1, wherein said rotary blades or wings are enabled to fold to a fixed deployed position from a folded position against said fuselage.

16. The vehicular system of claim 15, wherein said vehicle is configured with a tubular body aspect ratio, form factor, and payload capacity scaled for hand carry, for hand launch, for air drop, for catapult, or for tube launch system.

17. The vehicular system of claim 16, wherein said tube launch system includes one of mortar, cannon, air-gun, and grenade launcher.

18. The vehicular system of claim 1, wherein said rotor head and body comprises a rotor blade or wing and vane combination configured to enable controlled flight during descent.

19. The vehicular system of claim 18, wherein said rotor blade or wing and vane combination is hinged to be folded against said vehicle body assembly when not in use.

20. The vehicular system of claim 18 wherein said rotor blade or wing and vane combination are motorized to slow descent, to achieve temporary ascension, to hover, or to enable non-ballistic flight behavior.

21. The vehicular system of claim 18, wherein at least one element of said rotor blade or wing or vane combination is a passive element.

22. The vehicular system of claim 21, wherein said passive element is configured for augmented autorotation flying.

23. The vehicular system of claim 1, wherein said center of mass of said fuselage is configured to be uprightly floated on a body of water and said motors are separately driven so that said apical rotor assembly is configured to be initially activated during takeoff from water and both rotor assemblies are configured to be actuated during flight.

24. The vehicular system of claim 23, wherein said fuselage is configured with lateral vanes so as to control yaw upon initial activation of said apical rotor assembly during takeoff from water.

25. The vehicular system of claim 1, wherein said fuselage is configured with lateral vanes so as to control yaw during takeoff from water.

26. The vehicular system of claim 1, wherein said fuselage comprises one or more compartments for receiving a payload, a power supply, a sensor module, a night imaging module, a sonar module, a communications module, an avionics module, a navigation module, or a camera module.

27. The vehicular system of claim 1, wherein said fuselage comprises a communications module, said communications module having a radio transceiver configured to join a peer-to-peer or mesh network that includes one or more other communications assets.

28. The vehicular system of claim 27, wherein said communications module comprises on or more radio systems enabled to be linked by satellite to workstations or servers for uploading sensor data and for downloading navigation instructions.

29. The vehicular system of claim 1, wherein said rotor assemblies comprise fixed pitch rotary wings and said wings are configured for whisper flight.

30. The vehicular system of claim 1, wherein said fuselage is watertight and comprises a displacement and center of buoyant mass configured to vertically stand said rotor head above a waterline of said fuselage in a sea-air launch event, fins submersible below said waterline, and further comprises a submersible sonar transceiver, sensor, camera or other instrument package.

31. The vehicular system of claim 30, wherein said vehicular system comprises sensing intelligence and avionics to detect and overcome wave periodicity so as to time an execution of a sea-air launch event on a crest of a wave.

32. The vehicular system of claim 31, wherein said sonar transceiver is configured for passive detection mode, active detection mode, or Doppler detection mode, and for outputting a radio signal.

33. The vehicular system of claim 32, wherein said radio signal is receivable at a remote workstation for acoustic analysis.

34. The vehicular system of claim 1, wherein said rotor assemblies are separately driven by said motor speed controller and are counter-rotated with independently variable speed by said separate motors, thereby enabling control of yaw during flight.

* * * * *